US012725430B2

(12) United States Patent
Ozog et al.

(10) Patent No.: US 12,725,430 B2
(45) Date of Patent: Sep. 1, 2026

(54) CORRECTING AN ALIGNMENT OF POSITIONS OF POINTS AFFILIATED WITH AN OBJECT, IN IMAGES OF A LOCATION, THAT HAS A LINEAR FEATURE OR A PLANAR FEATURE

(71) Applicant: Woven by Toyota, Inc., Tokyo (JP)

(72) Inventors: Paul J. Ozog, Ann Arbor, MI (US); Hai Jin, Fremont, CA (US); Yucong Lin, Ann Arbor, MI (US)

(73) Assignee: Woven by Toyota, Inc., Tokyo (JP)

( * ) Notice: Subject to any disclaimer, the term of this patent is extended or adjusted under 35 U.S.C. 154(b) by 400 days.

(21) Appl. No.: 18/462,690

(22) Filed: Sep. 7, 2023

(65) Prior Publication Data

US 2025/0086984 A1 Mar. 13, 2025

(51) Int. Cl.

*G06V 20/56* (2022.01)
*G06T 7/70* (2017.01)
*G06V 20/58* (2022.01)

(52) U.S. Cl.

CPC .............. *G06V 20/588* (2022.01); *G06T 7/70* (2017.01); *G06V 20/582* (2022.01); *G06T 2207/30256* (2013.01)

(58) Field of Classification Search

CPC .................... G06V 20/588; G06T 7/70; G06T 2207/30256; G06T 2207/30252

See application file for complete search history.

(56) References Cited

U.S. PATENT DOCUMENTS 9,989,969 B2 6/2018 Eustice et al.
12,447,992 B2 * 10/2025 Fasola .................. G01S 7/4972

(Continued)

FOREIGN PATENT DOCUMENTS

CN 111709997 A 9/2020
CN 114943785 A 8/2022

(Continued)

OTHER PUBLICATIONS

Levinson et al. "Robust vehicle localization in urban environments using probabilistic maps," 2010 IEEE international conference on robotics and automation, IEEE, 2010, pp.

(Continued)

*Primary Examiner* — Vu Le
*Assistant Examiner* — Zaid Muhammad Saleh
(74) *Attorney, Agent, or Firm* — Christopher G. Darrow; Darrow Mustafa PC

(57) ABSTRACT

A system for correcting an alignment of positions of points affiliated with an object, in images of a location, that has one or more of a linear feature or a planar feature can include a processor and a memory. The memory can store an alignment module and a communications module. The alignment module can include instructions to: (1) identify, within data affiliated with the images, the positions of the points affiliated with the object that has the one or more of the linear feature or the planar feature and (2) correct, in a manner that recognizes that the object has the one or more of the linear feature or the planar feature, the alignment of the positions to produce a digital map of the location. The communications module can include instructions to transmit the digital map to a vehicle to be used to control a movement of the vehicle.

20 Claims, 26 Drawing Sheets

(56) References Cited

U.S. PATENT DOCUMENTS

| | | | | |
|---|---|---|---|---|
| 2019/0277632 | A1* | 9/2019 | Zhang | G01C 21/005 |
| 2020/0217667 | A1* | 7/2020 | Kim | G06T 7/73 |
| 2020/0393265 | A1* | 12/2020 | Piao | G01C 21/3815 |
| 2022/0083792 | A1* | 3/2022 | Naseer | G06T 17/05 |
| 2022/0178718 | A1 | 6/2022 | Xia et al. | |
| 2024/0059285 | A1* | 2/2024 | Ng | B60W 50/14 |

FOREIGN PATENT DOCUMENTS

| | | | | |
|---|---|---|---|---|
| CN | 116033330 | A * | 4/2023 | G01S 13/726 |
| WO | WO-2019156563 | A2 * | 8/2019 | G06T 7/187 |
| WO | WO-2020156923 | A2 * | 8/2020 | G06T 7/579 |
| WO | WO-2020196677 | A1 * | 10/2020 | G06T 9/001 |
| WO | WO-2023194203 | A1 * | 10/2023 | G06T 7/70 |

OTHER PUBLICATIONS

Welte et al. “Improved data association using buffered pose adjustment for map-aided localization,” IEEE Robotics and Automation Letters, 2020, pp. 6334-6341.

Baahraini et al. “SLAM in dynamic environments via ML-RANSAC,” Mechatronics 49, 2018, pp. 105-118.

Ros et al. “Vision-based offline-online perception paradigm for autonomous driving,” IEEE Winter Conference on Applications of Computer Vision, IEEE, Jan. 5, 2015, pp. 231-238.

Azim et al. “Detection, classification and tracking of moving objects in a 3D environment,” 2012 IEEE Intelligent Vehicles Symposium. IEEE, 2012, pp. 802-807.

Dahal et al. “Extended object tracking in curvilinear road coordinates for autonomous driving,” IEEE Transactions on Intelligent Vehicles, 2022, pp.

Cho et al. “Object tracking with enhanced data association using a 3D range sensor for an unmanned ground vehicle,” Journal of Mechanical Science and Technology 28, 2014, pp. 4381-4388.

Wang et al. “Parking Area Data Collection and Scenario Extraction for the Purpose of Automatic Parking ADAS Function,” IOP Conference Series: Materials Science and Engineering, vol. 780. No. 3. IOP Publishing, Mar. 1, 2020, pp.

Assignment problem—Wikipedia.

Hungarian algorithm—Wikipedia.

Luca Carlone, Lecture 23—Simultaneous Localization and Mapping I found at chrome-extension://efaidnbmnnnibpcajpcglclefindmkaj/https://vnav.mit.edu/material/23-SLAM1-formulationsAndSparsity-notes.pdf.

Xiaogang Ruan et al., “Optimized Data Association Based on Gaussian Mixture Model,”.

Zui Tao et al., “Mapping and localization using GPS, lane markings and proprioceptive sensors,” 2013 IEEE/RSJ International Conference on Intelligent Robots and Systems, pp. 406-412, Nov. 3, 2013.

Fukai Zhang et al., “LAP-SLAM: A Line-Assisted Point-Based Monocular VSLAM,” Electronics, vol. 8, No. 2, pp. 243-259, Feb. 20, 2019.

Raúl Mur-Artal et al., “ORB-SLAM: a Versatile and Accurate Monocular SLAM System,” IEEE Transactions on Robotics, vol. 31, No. 5, pp. 1147-1163, Oct. 2015.

Sabita Pal et al., “Evolution of Simultaneous Localization and Mapping Framework for Autonomous Robotics—A Comprehensive Review,” Journal of Autonomous Vehicles and Systems, vol. 2, No. 2, Apr. 2022.

Wei-Chiu Ma et al., “Exploiting Sparse Semantic HD Maps for Self-Driving Vehicle Localization,” 2019 IEEE/RSJ International Conference on Intelligent Robots and Systems (IROS), pp. 5304-5311, Nov. 1, 2019.

Spicy-optimize-linear_sum_assignment found at https://docs.scipy.org/doc/scipy-1.1.0/reference/generated/scipy.optimize.linear_sum_assignment.html.

Mahalanobis distance—Wikipedia.

Ellipsoid—Wikipedia.

* cited by examiner

FIG. 6

| Ref. | Data |
|---|---|
| 1010 | camera id:_72GZ3300084 |
| 1012 | camera: (latitude: 37.441862, longitude: -122.143121, altitude: 10.67), (roll: 3.17 degrees, pitch: 2.58 degrees, yaw: +3.29 degrees) |
| 602 | road_boundary: (latitude: 37.441903, longitude: -122.143181, altitude: 9.15) |
| 604 | road_boundary: (latitude: 37.441903, longitude: -122.143101, altitude: 9.15) |
| 606 | lane_boundary: (latitude: 37.441903, longitude: -122.143141, altitude: 9.15) |
| 608 | sign_type: slow, sign_center: (latitude: 37.441925, longitude: -122.143097, altitude: 13.65), sign_width: 1.07m, sign_height: 1.07m) |
| 610 | sign_type: slow, sign_center: (latitude: 37.441888, longitude: -122.143097, altitude: 13.65), sign_width: 1.07m, sign_height: 1.07m) |

$t_1$

1004

| Ref. | Data |
|---|---|
| 1010 | camera id:_72GZ3300084 |
| 1014 | camera: (latitude: 37.441853, longitude: -122.143121, altitude: 10.61), (roll: 2.64 degrees, pitch: 1.95 degrees, yaw: +3.13 degrees) |
| 702 | road_boundary: (latitude: 37.441880, longitude: -122.143181, altitude: 9.09) |
| 704 | road_boundary: (latitude: 37.441880, longitude: -122.143101, altitude: 9.09) |
| 706 | lane_boundary: (latitude: 37.441880, longitude: -122.143141, altitude: 9.09) |
| 608 | sign_type:_slow, sign_center: (latitude: 37.441907, longitude: -122.143097, altitude: 13.59), sign_width: 1.07m, sign_height: 1.07m) |
| 610 | sign_type:_slow, sign_center: (latitude: 37.441871, longitude: -122.143097, altitude: 13.59), sign_width: 1.07m, sign_height: 1.07m) |

Figure 10B:
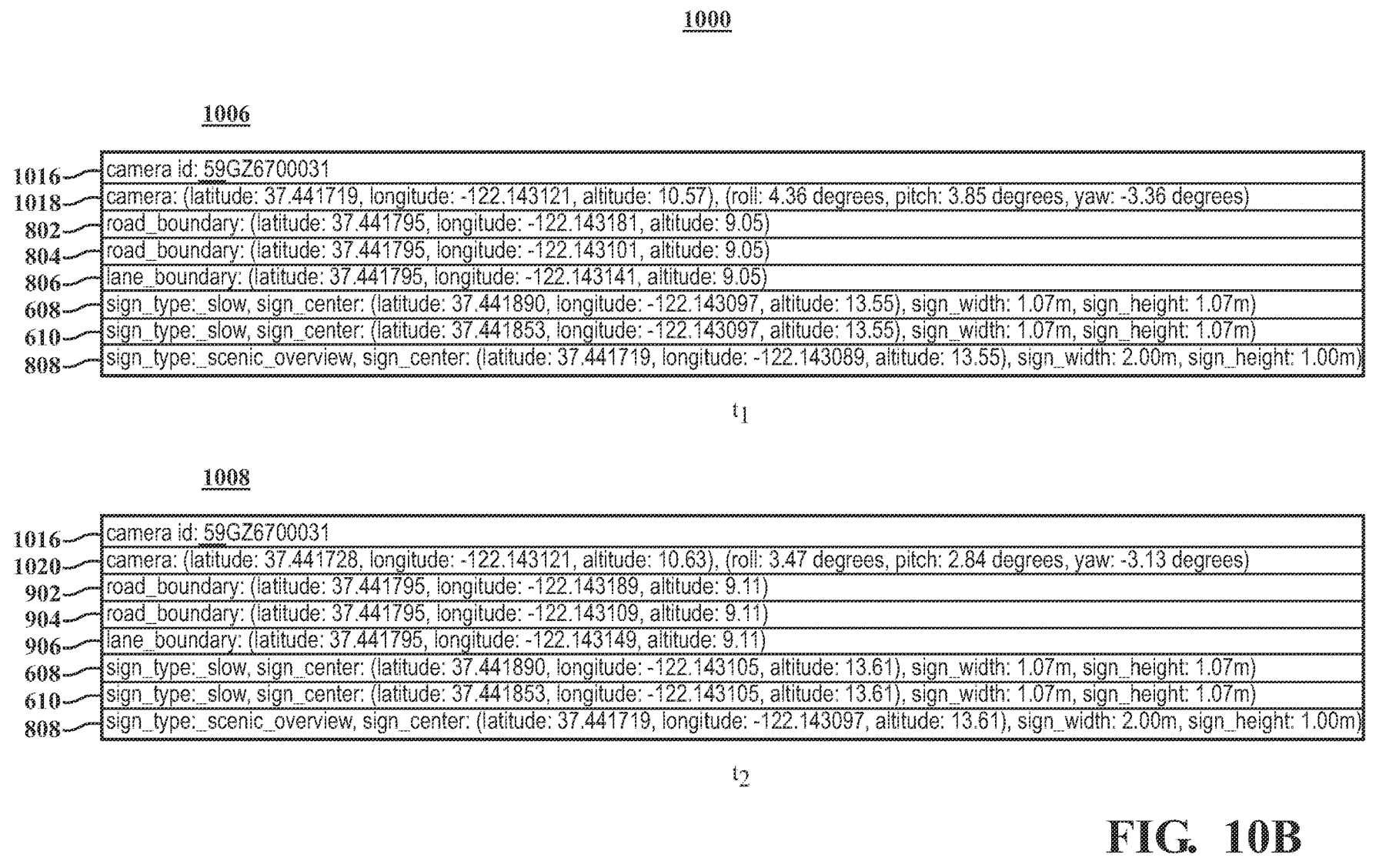

1016 camera id: 59GZ6700031
1018 camera: (latitude: 37.441719, longitude: -122.143121, altitude: 10.57), (roll: 4.36 degrees, pitch: 3.85 degrees, yaw: -3.36 degrees)
802 road_boundary: (latitude: 37.441795, longitude: -122.143181, altitude: 9.05)
804 road_boundary: (latitude: 37.441795, longitude: -122.143101, altitude: 9.05)
806 lane_boundary: (latitude: 37.441795, longitude: -122.143141, altitude: 9.05)
608 sign_type:_slow, sign_center: (latitude: 37.441890, longitude: -122.143097, altitude: 13.55), sign_width: 1.07m, sign_height: 1.07m)
610 sign_type:_slow, sign_center: (latitude: 37.441853, longitude: -122.143097, altitude: 13.55), sign_width: 1.07m, sign_height: 1.07m)
808 sign_type:_scenic_overview, sign_center: (latitude: 37.441719, longitude: -122.143089, altitude: 13.55), sign_width: 2.00m, sign_height: 1.00m)

$t_1$

1008

1016 camera id: 59GZ6700031
1020 camera: (latitude: 37.441728, longitude: -122.143121, altitude: 10.63), (roll: 3.47 degrees, pitch: 2.84 degrees, yaw: -3.13 degrees)
902 road_boundary: (latitude: 37.441795, longitude: -122.143189, altitude: 9.11)
904 road_boundary: (latitude: 37.441795, longitude: -122.143109, altitude: 9.11)
906 lane_boundary: (latitude: 37.441795, longitude: -122.143149, altitude: 9.11)
608 sign_type:_slow, sign_center: (latitude: 37.441890, longitude: -122.143105, altitude: 13.61), sign_width: 1.07m, sign_height: 1.07m)
610 sign_type:_slow, sign_center: (latitude: 37.441853, longitude: -122.143105, altitude: 13.61), sign_width: 1.07m, sign_height: 1.07m)
808 sign_type:_scenic_overview, sign_center: (latitude: 37.441719, longitude: -122.143097, altitude: 13.61), sign_width: 2.00m, sign_height: 1.00m)

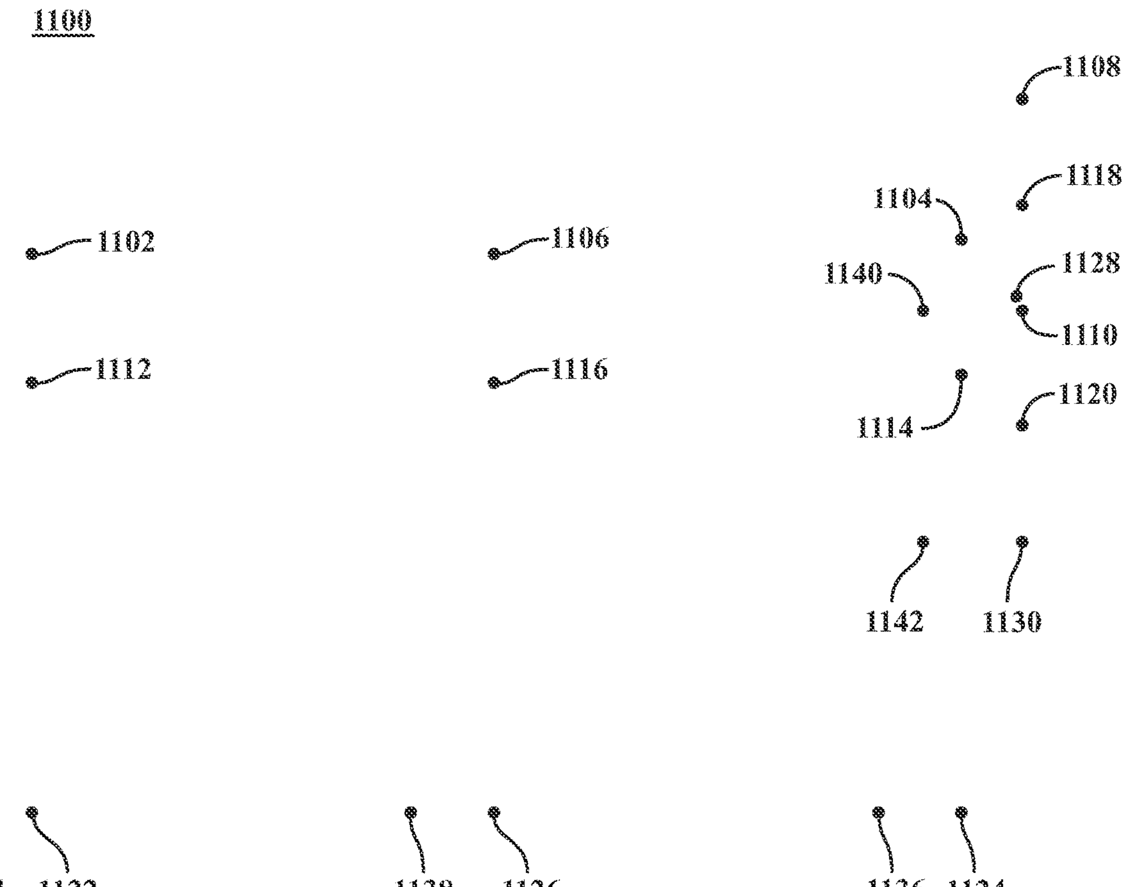
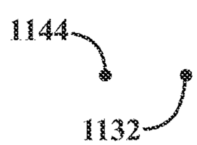
FIG. 11

1500
1506, 1522, 1502
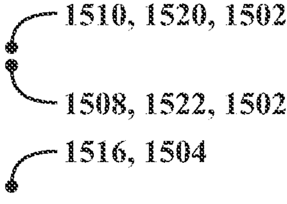
1512, 1520, 1502
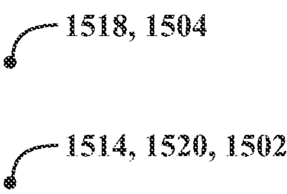
FIG. 15

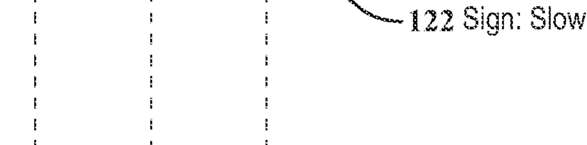
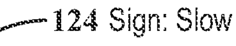
FIG. 16

1900
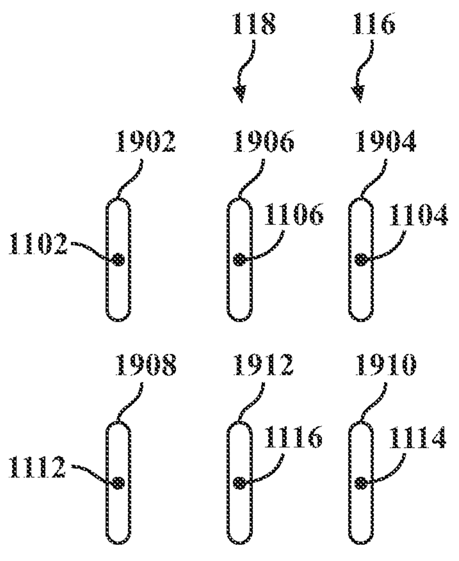
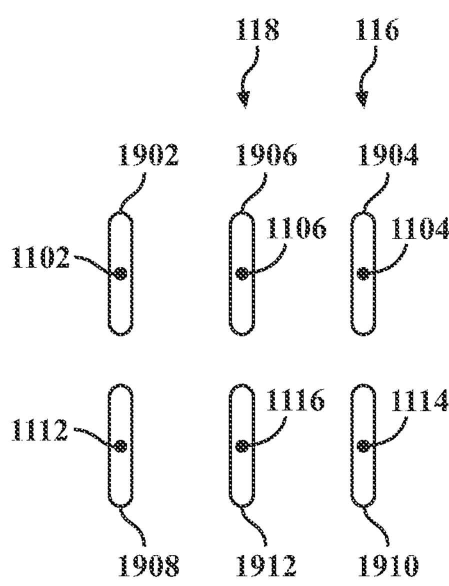
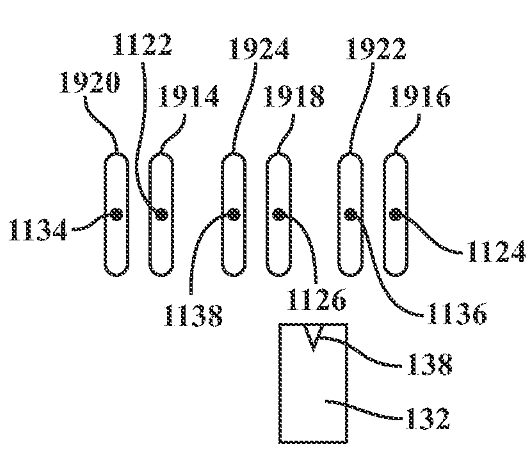
(a)
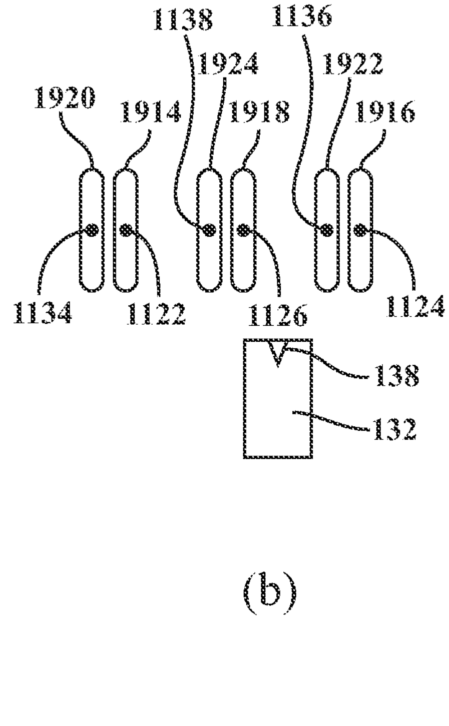
(b)
FIG. 19

2100
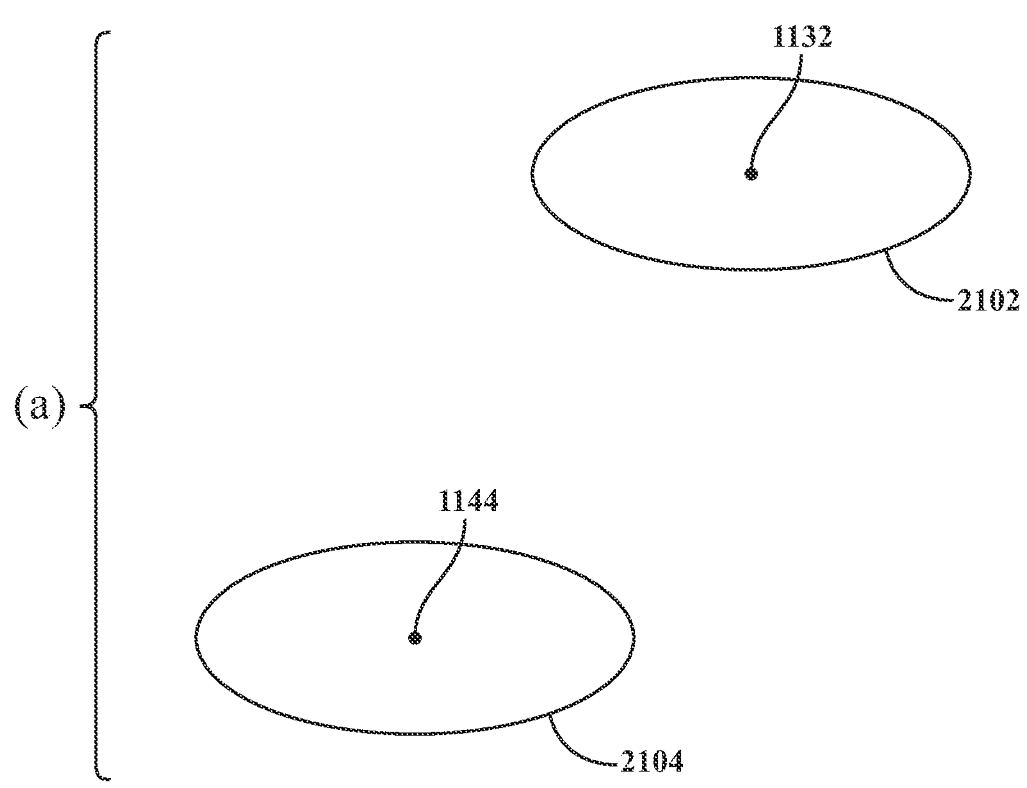
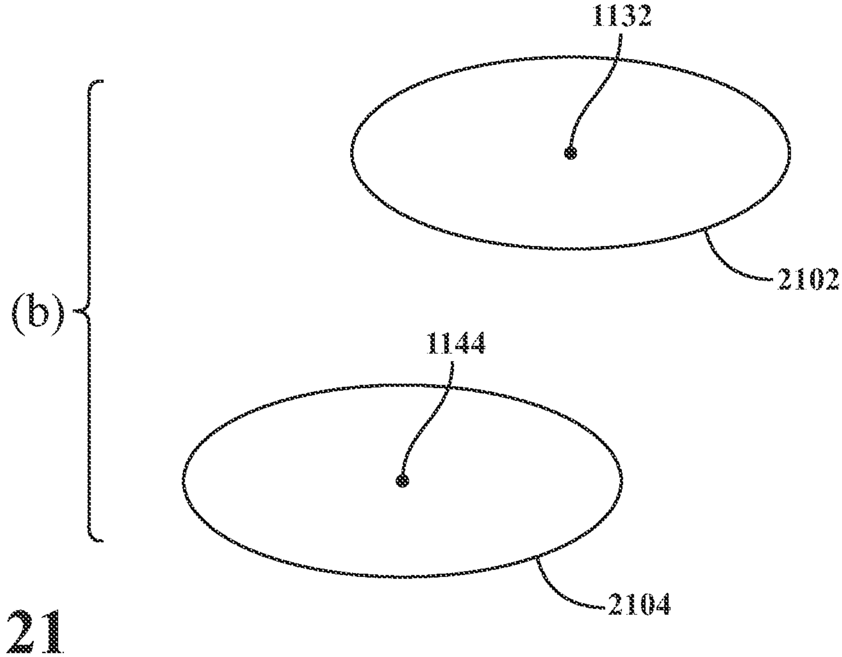
FIG. 21

2200

2202

| | |
|---|---|
| 1010 | camera id:_72GZ3300084 |
| 1012 | camera: (latitude: 37.441857, longitude: -122.143121, altitude: 10.64), (roll: 2.90 degrees, pitch: 2.26 degrees, yaw: +3.21 degrees) |
| 602 | road_boundary: (latitude: 37.441892, longitude: -122.143181, altitude: 9.15) |
| 604 | road_boundary: (latitude: 37.441892, longitude: -122.143101, altitude: 9.15) |
| 606 | lane_boundary: (latitude: 37.441892, longitude: -122.143141, altitude: 9.15) |
| 608 | sign_type: slow, sign_center: (latitude: 37.441916, longitude: -122.143097, altitude: 13.65), sign_width: 1.07m, sign_height: 1.07m) |
| 610 | sign_type: slow, sign_center: (latitude: 37.441880, longitude: -122.143097, altitude: 13.65), sign_width: 1.07m, sign_height: 1.07m) |

$t_1$

2204

| | |
|---|---|
| 1010 | camera id:_72GZ3300084 |
| 1014 | camera: (latitude: 37.441853, longitude: -122.143121, altitude: 10.61), (roll: 2.64 degrees, pitch: 1.95 degrees, yaw: +3.13 degrees) |
| 702 | road_boundary: (latitude: 37.441880, longitude: -122.143181, altitude: 9.09) |
| 704 | road_boundary: (latitude: 37.441880, longitude: -122.143101, altitude: 9.09) |
| 706 | lane_boundary: (latitude: 37.441880, longitude: -122.143141, altitude: 9.09) |
| 608 | sign_type:_slow, sign_center: (latitude: 37.441907, longitude: -122.143097, altitude: 13.59), sign_width: 1.07m, sign_height: 1.07m) |
| 610 | sign_type:_slow, sign_center: (latitude: 37.441871, longitude: -122.143097, altitude: 13.59), sign_width: 1.07m, sign_height: 1.07m) |

| Ref. | Entry |
| --- | --- |
| 1016 | camera id: 59GZ6700031 |
| 1018 | camera: (latitude: 37.441728, longitude: -122.143121, altitude: 10.59), (roll: 4.06 degrees, pitch: 3.52 degrees, yaw: -3.29 degrees) |
| 802 | road_boundary: (latitude: 37.441804, longitude: -122.143181, altitude: 9.05) |
| 804 | road_boundary: (latitude: 37.441804, longitude: -122.143101, altitude: 9.05) |
| 806 | lane_boundary: (latitude: 37.441804, longitude: -122.143141, altitude: 9.05) |
| 608 | sign_type:_slow, sign_center: (latitude: 37.441899, longitude: -122.143097, altitude: 13.55), sign_width: 1.07m, sign_height: 1.07m) |
| 610 | sign_type:_slow, sign_center: (latitude: 37.441862, longitude: -122.143097, altitude: 13.55), sign_width: 1.07m, sign_height: 1.07m) |
| 808 | sign_type:_scenic_overview, sign_center: (latitude: 37.441728, longitude: -122.143089, altitude: 13.55), sign_width: 2.00m, sign_height: 1.00m) |

$t_1$

2208

| Ref. | Entry |
| --- | --- |
| 1016 | camera id: 59GZ6700031 |
| 1020 | camera: (latitude: 37.441737, longitude: -122.143121, altitude: 10.61), (roll: 3.77 degrees, pitch: 3.17 degrees, yaw: -3.20 degrees) |
| 902 | road_boundary: (latitude: 37.441804, longitude: -122.143185, altitude: 9.11) |
| 904 | road_boundary: (latitude: 37.441804, longitude: -122.143105, altitude: 9.11) |
| 906 | lane_boundary: (latitude: 37.441804, longitude: -122.143145, altitude: 9.11) |
| 608 | sign_type:_slow, sign_center: (latitude: 37.441899, longitude: -122.143101, altitude: 13.61), sign_width: 1.07m, sign_height: 1.07m) |
| 610 | sign_type:_slow, sign_center: (latitude: 37.441862, longitude: -122.143101, altitude: 13.61), sign_width: 1.07m, sign_height: 1.07m) |
| 808 | sign_type:_scenic_overview, sign_center: (latitude: 37.441728, longitude: -122.143093, altitude: 13.61), sign_width: 2.00m, sign_height: 1.00m) |

CORRECTING AN ALIGNMENT OF POSITIONS OF POINTS AFFILIATED WITH AN OBJECT, IN IMAGES OF A LOCATION, THAT HAS A LINEAR FEATURE OR A PLANAR FEATURE

TECHNICAL FIELD

The disclosed technologies are directed to correcting an alignment of positions of points affiliated with an object, in images of a location, that has a linear feature or a planar feature.

BACKGROUND

A digital map can be an electronic representation of a conventional paper road map. For example, an automotive navigation system can use information received from a digital map and information received from a global navigation satellite system (GNSS) to produce a turn-by-turn navigation service. A turn-by-turn navigation service can provide a route between an origination point and a destination point. A position of a vehicle determined by such a turn-by-turn navigation service can be within a meter of an actual position.

More recently, technologies have been developed to automate one or more operations of one or more vehicle systems to control a movement of a vehicle. Such technologies can use information received from a digital map to control such movement. However, such a digital map can be required to indicate positions of objects with a degree of accuracy that is within a decimeter. Accordingly, development of technologies to automate control of movement of vehicles have been accompanied by efforts to improve the degree of accuracy of digital maps. This has led to the production of high-definition (HD) maps.

An HD map can be a digital map that includes additional information to improve the degree of accuracy required to automate control of a movement of a vehicle. An HD map can be characterized as having layers of additional information. Each layer of additional information can be affiliated with a specific category of additional information. These layers can include, for example, a layer of a base map, a layer of a geometric map, and a layer of a semantic map. The base map, the geometric map, and the semantic map can include information about static aspects of a location.

The geometric map can be produced, for example, using a simultaneous localization and mapping (SLAM) technique. A SLAM technique can use proprioception information to estimate a pose (i.e., a position and an orientation) of a vehicle, and perceptual information to correct an estimate of the pose. Usually, the proprioception information can be one or more of GNSS information, inertial measurement unit (IMU) information, odometry information, or the like. For example, the odometry information can be a value included in a signal sent to a vehicle system (e.g., an accelerator). The perceptual information can often be one or more of point cloud information from a ranging sensor (e.g., a light detection and ranging (lidar) system), image data from one or more images from one or more image sensors or cameras, or the like. The geometric map can include, for example, a ground map of improved surfaces for use by vehicles and pedestrians (e.g., drivable surfaces (e.g., roads)), and voxelized geometric representations of three-dimensional objects at the location.

The semantic map can include semantic information about objects included at the location. The objects can include, for example, landmarks. A landmark can be, for example, a feature that can be easily re-observed and distinguished from other features at the location. The term landmark, in a context of indicating positions of objects with a degree of accuracy that is within a decimeter, can be different from a conventional use of the term landmark. For example, landmarks can include lane boundaries, road boundaries, intersections, crosswalks, bus lanes, parking spots, signs, signs painted on roads, traffic lights, or the like.

Because an HD map can be used to localize a vehicle, which can be performed to control a movement of the vehicle, not only do positions of objects need to be indicated on the HD map with a high degree of accuracy, but also the HD map can be required to be updated at a high rate to account for changes in objects or positions of objects expected to be indicated on the HD map.

SUMMARY

In an embodiment, a system for correcting an alignment of positions of points affiliated with an object, in images of a location, that has one or more of a linear feature or a planar feature can include a processor and a memory. The memory can store an alignment module and a communications module. The alignment module can include instructions that, when executed by the processor, cause the processor to: (1) identify, within data affiliated with the images of the location, the positions of the points affiliated with the object, in the images, that has the one or more of the linear feature or the planar feature and (2) correct, in a manner that recognizes that the object has the one or more of the linear feature or the planar feature, the alignment of the positions to produce a digital map of the location. The communications module can include instructions that, when executed by the processor, cause the processor to transmit the digital map to a specific vehicle to be used to control a movement of the specific vehicle.

In another embodiment, a method for correcting an alignment of positions of points affiliated with an object, in images of a location, that has one or more of a linear feature or a planar feature can include identifying, by a processor and within data affiliated with the images of the location, the positions of the points affiliated with the object, in the images, that has the one or more of the linear feature or the planar feature. The method can include correcting, by the processor in a manner that recognizes that the object has the one or more of the linear feature or the planar feature, the alignment of the positions to produce a digital map of the location. The method can include transmitting, by the processor, the digital map to a specific vehicle to be used to control a movement of the specific vehicle.

In another embodiment, a system for performing data association operations for positions of points that represent objects in images of a location can include a processor and a memory. The memory can store a data association module, a production module, and a communications module. The data association module can include instructions that, when executed by the processor, cause the processor to perform, using a global nearest neighbor technique, a data association operation to determine if the positions of two or more points, of the points, correspond to a same object, of the objects, or to different objects of the objects. The production module can include instructions that, when executed by the processor, cause the processor to produce, based on a result of the global nearest neighbor technique, a digital map of the location. The communications module can include instructions that, when executed by the processor, cause the processor to transmit the digital map to a specific vehicle to be used to control a movement of the specific vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 6 includes a diagram that illustrates an example of keypoints of landmarks in the image illustrated in FIG. 2, according to the disclosed technologies.

FIG. 7 includes a diagram that illustrates an example of keypoints of landmarks in the image illustrated in FIG. 3, according to the disclosed technologies.

FIG. 8 includes a diagram that illustrates an example of keypoints of landmarks in the image illustrated in FIG. 4, according to the disclosed technologies.

FIGS. 10A and 10B include an example of tables that illustrate data affiliated with images of the location illustrated in FIG. 1, according to the disclosed technologies.

FIG. 11 includes a diagram that illustrates an example of the positions of the points of the landmarks affiliated with the items of the data contained in the tables included in FIGS. 10A and 10B, according to the disclosed technologies.

FIG. 14 includes a diagram that illustrates a first example of positions of points affiliated with a data association determination, according to the disclosed technologies.

FIG. 15 includes a diagram that illustrates a second example of positions of points affiliated with a data association determination, according to the disclosed technologies.

FIG. 16 includes an example of a digital map, according to the disclosed technologies.

FIG. 19 includes a diagram that illustrates an example of the positions of the points of the objects, included in the diagram illustrated in FIG. 11, that have horizontal linear features, according to the disclosed technologies.

FIG. 21 includes a diagram that illustrates an example of the positions of the points of the objects, included in the diagram illustrated in FIG. 11, that have planar features, according to the disclosed technologies.

FIGS. 22A and 22B include an example of tables that illustrate the data contained in the tables included in FIGS. 10A and 10B, but with values affiliated with a correction of an alignment of the positions of the points, according to the disclosed technologies.

DETAILED DESCRIPTION

Figure 1:
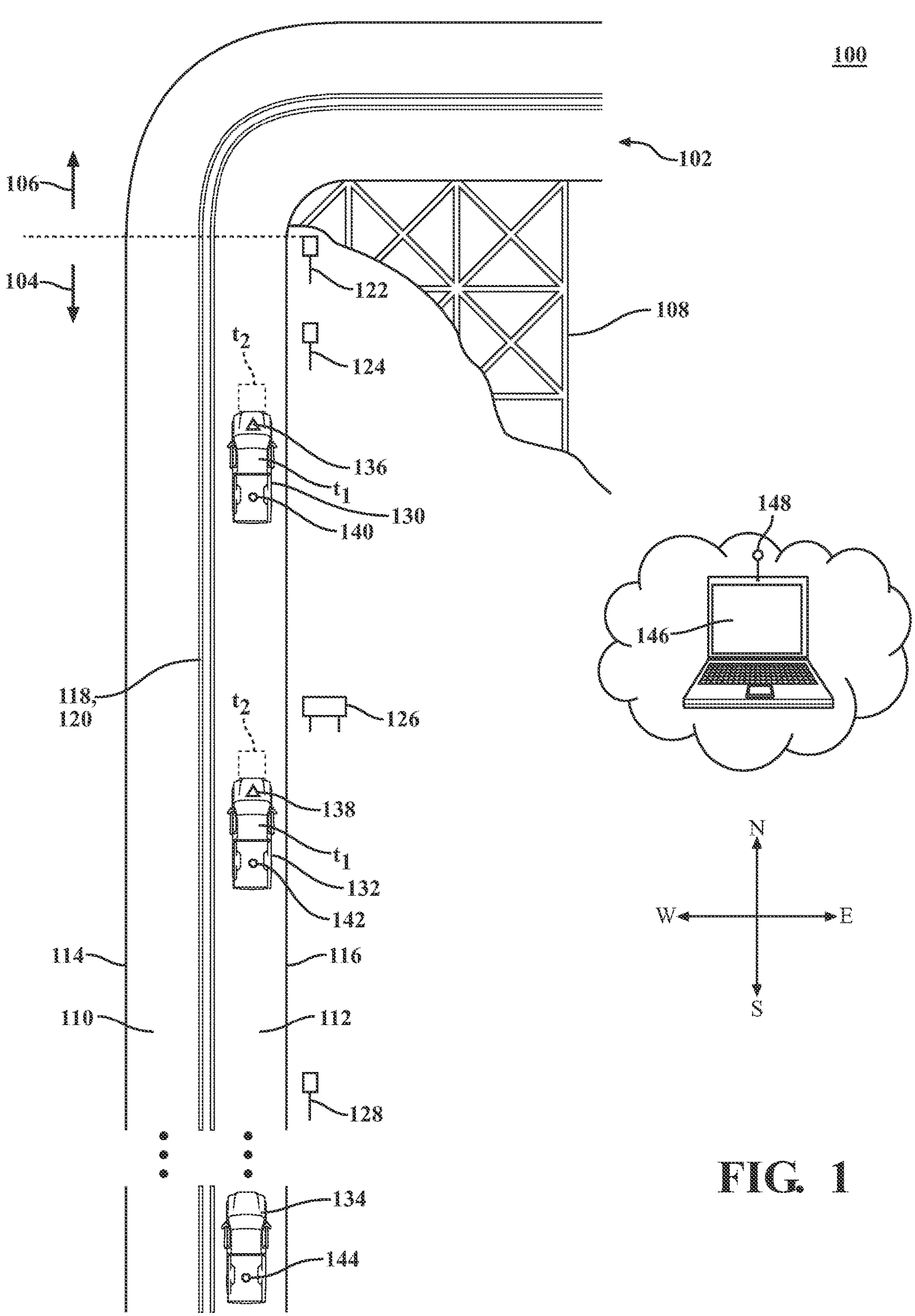
FIG. 1 includes a diagram that illustrates an example of an environment for producing, from data affiliated with images of a location, but excluding pixel color data, a digital map of the location, according to the disclosed technologies.

Simultaneous localization and mapping (SLAM) is a phrase that can refer to a technology that enables a mobile robot (e.g., an automated vehicle or an autonomous vehicle) to move through an unknown location while simultaneously determining a pose (i.e., a position and an orientation) of the vehicle at the location (i.e., localization) and mapping the location. Typically, a SLAM technique can operate over discrete units of time and use proprioception information to estimate a pose of the vehicle, and perceptual information to correct an estimate of the pose. Usually, the proprioception information can be one or more of global navigation satellite system (GNSS) information, inertial measurement unit (IMU) information, odometry information, or the like. For example, the odometry information can be a value included in a signal sent to a vehicle system (e.g., an accelerator). The perceptual information can often be one or more of point cloud information from a ranging sensor (e.g., a light detection and ranging (lidar) system), image data from one or more images from one or more image sensors or cameras, or the like.

For example, for a SLAM technique that uses point cloud information from a ranging sensor, the ranging sensor can provide the vehicle with distances and bearings to objects in the location and the SLAM technique can operate to identify salient objects as landmarks. For example, for a SLAM technique that uses image data from one or more images from one or more image sensors or cameras, which can be referred to as visual SLAM, distances and bearings to objects can be determined using a photogrammetric range imaging technique (e.g., a structure from motion (SfM) technique) applied to a sequence of two-dimensional images. Because a camera can be less expensive than a lidar device and more vehicles are equipped with cameras than with lidar devices, considerable effort has been expended to develop visual SLAM for use in producing geometric maps as layers of high-definition (HD) maps used to control movements of vehicles.

Moreover, although SLAM techniques were originally developed to operate in real-time (i.e., simultaneously localize and map), the use of SLAM techniques to produce geometric maps has led to the development of SLAM techniques that can operate in a setting other than in a moving vehicle. In such SLAM techniques, recordings of the proprioception information and the perceptual information can be used. Such SLAM techniques can be referred to as offline SLAM. By using the recordings of the proprioception information and the perceptual information, corrections to estimates of poses of a vehicle can be performed concurrently on one or more finite sequences of the discrete units of time over which the SLAM techniques were operated. Such corrections can be realized by various procedures, which can include, for example, one or more techniques for optimization. An optimization can result in more accurate corrections to the estimates of the poses of the vehicle if one or more objects included in the recordings of the perceptual information are included in a plurality of instances of the recordings. (Such a situation can be referred to as closing the loop.) That is, corrections to the estimates of the poses of the vehicle can be more accurate for an optimization in which the same object is included in the recordings of the perceptual information in a plurality of instances than for an optimization in which the same object is not included in the recordings of the perceptual information in a plurality of instances.

The recordings of the proprioception information and the perceptual information can be obtained, for example, by one or more probe vehicles. A probe vehicle can be a vehicle that intentionally performs one or more passes through a location to obtain the recordings of the proprioception information and the perceptual information. Moreover, during each pass, of the one or more passes, a plurality of instances of recordings of the proprioception information and the perceptual information can be obtained. Having: (1) a probe vehicle obtain, during a pass through a location, a plurality of instances of recordings of the proprioception information and the perceptual information, (2) a plurality of probe vehicles pass through a location, or (3) both can increase a likelihood that one or more objects included in the recordings of the perceptual information are included in the plurality of instances of the recordings so that results of an optimization will include a situation of closing the loop.

Because an HD map can be used to localize a vehicle, which can be performed to control a movement of the vehicle, inclusion of indications of certain objects (e.g., landmarks) on the HD map can be more important than others. Such important landmarks can include, for example, lane boundaries, road boundaries, intersections, crosswalks, bus lanes, parking spots, signs, signs painted on roads, traffic lights, or the like. The disclosed technologies are directed to producing, from data affiliated with images of a location, a digital (e.g., HD) map of the location. The digital map can be produced from the data affiliated with the images. The data, for an image of the images, can exclude pixel color data, but can include information about: (1) a pose of a camera that produced the image and (2) one or more of a position of a point on: (a) a lane boundary of a lane of a road in the image, (b) a road boundary of the road, or (c) another landmark in the image. The digital map can be transmitted to a specific vehicle to be used to control a movement of the specific vehicle.

Additionally, for example, the data affiliated with the images can be received from a set of vehicles (e.g., probe vehicles). A set of cameras can be attached to the set of vehicles. For example, one camera, of the set of cameras, can be attached to one vehicle of the set of vehicles. For example, a camera, of the set of cameras, can produce images. For example, the images can be produced at a specific production rate. For example, the specific production rate can be ten hertz. For example, the camera can be a component in a lane keeping assist (LKA) system. For example: (1) the data affiliated with the images can be received, by a system that implements the disclosed technologies, from the set of vehicles (e.g., the probe vehicles) at a first time, (2) the digital map, produced by the system that implements the disclosed technologies and from the data, can be transmitted to the specific vehicle at a second time, and (3) a difference between the first time and the second time can be less than a specific duration of time. For example, the specific duration of time can be thirty minutes.

The disclosed technologies can produce the data affiliated with the images of the location using, for example, visual SLAM techniques. For example, a camera attached to a vehicle of the set of vehicles (e.g., a probe vehicle) can produce the images. For example, the images can be produced at a specific production rate. For example, the specific production rate can be ten hertz. Objects in the images can be detected using, for example, object detection techniques. Objects in the images can be recognized using, for example, object recognition techniques. Semantic information can be affiliated with the objects. For example, objects that qualify as landmarks can be determined. For example, the landmarks can include lane boundaries, road boundaries, intersections, crosswalks, bus lanes, parking spots, signs, signs painted on roads, traffic lights, or the like.

A lane boundary can separate one lane of a road from another lane of the road. A lane boundary can be indicated, for example, by one or more of road surface markings, observations of differences in pavement on a road, observations of trajectories of vehicles, or the like. The road surface markings for a lane boundary can be, for example, lane markings. The lane markings can be, for example, a series of dashed line segments along the lane boundary.

A road boundary can separate an improved surface for use by vehicles and pedestrians (e.g., a drivable surface (e.g., a road)) from other surfaces. A road boundary can be indicated by one or more of road surface markings, curbs, observations of differences of degrees of improvement between adjacent surfaces, or the like. The road surface markings for a road boundary can be, for example, a continuous line along the road boundary.

Because: (1) positions, not depictions, of landmarks in an HD map used to localize a vehicle, which can be performed to control a movement of the vehicle, need to be indicated with a high degree of accuracy and (2) images of a location can be produced at a specific production rate, depictions of the landmarks likely can be included in several of the images of the location. However, for an image, of the images of the location, a position of any of a lane boundary of a lane of a road in the image, a road boundary of the road, or another landmark in the image can be represented by a position of a point on the lane boundary, the road boundary, or the other landmark. For example, the position of the point on the lane boundary, the road boundary, or the landmark can be affiliated with a position of a keypoint of an object, in the image, that represents the lane boundary, the road boundary, or the landmark. A keypoint can be a point in an object that has a potential of being repeatedly detected under different imaging conditions. Keypoints in objects can be extracted using, for example, keypoint extraction techniques.

The vehicle of the set of vehicles (e.g., the probe vehicle) can use, for example, proprioception information (e.g., one or more of GNSS information, IMU information, odometry information, or the like) to estimate a pose (i.e., a position and an orientation) of a camera (e.g., attached to the vehicle). The vehicle (e.g., the probe vehicle) can use, for example, as perceptual information, results of a photogrammetric range imaging technique (e.g., an SfM technique) to determine distances and bearings to the landmarks (e.g., keypoints) in the images. Positions of points (e.g., keypoints) on the landmarks can be determined, for example, using: (1) the pose of the camera (e.g., attached to the vehicle) and (2) the distances and the bearings to the landmarks (e.g., keypoints) in the images. Such positions can be, for example, estimated positions of the landmarks at the location and not positions of pixels, affiliated with the landmarks, in the images.

In this manner, the data affiliated with the images of the location can, for an image of the images, exclude pixel color data, but include information about: (1) the pose of the camera that produced the image and (2) one or more positions of points on landmarks in the image. For example, an amount of the data affiliated with the image can be less than a threshold amount. For example, the threshold amount can be 300 bytes. For example, the landmark can be a sign. For example, the data affiliated with the images can include information about the sign. For example, the information about the sign can include: (1) for a center of the sign, a latitude position, a longitude position, and an altitude, (2) a height of the sign, and (3) a width of the sign. Additionally or alternatively, for example, the information about the sign can include information about a message communicated by the sign. For example, the data affiliated with the images can be produced by an automated driving system of active safety technologies and advanced driver assistance systems (ADAS). For example, the automated driving system can be a third generation of the Toyota Safety Sense™ system (TSS3).

For example, for a vehicle of the set of vehicles (e.g., the probe vehicles), a transmission of a batch of the data affiliated with the images, produced by a camera of the vehicle of the set of vehicles (e.g., the probe vehicles), can be received in a specific duration of time. For example, the specific duration of time can be thirty seconds. For example, the transmission of the batch can be received at a specific communication rate. For example, the specific communication rate can be once per thirty seconds.

The disclosed technologies can produce, from the data affiliated with the images of the location, the digital (e.g., HD) map of the location using, for example, offline SLAM techniques. For example, the digital map can be produced by processing, using one or more data association techniques, the data affiliated with the images to determine correspondence of the position of the point (e.g., keypoint) affiliated with a specific object (e.g., landmark), included in a first image of the images, with the position of the point (e.g., keypoint) affiliated with the specific object (e.g., landmark) included in a second image of the images. For example, the one or more data association techniques can include a global nearest neighbor technique. In a performance of a data association technique to determine an existence or a lack of the existence of a correspondence of a position of a point in a first image with a position of a point in a second image, a global nearest neighbor technique can use other information in addition to a measurement of a distance between the position of the point in the first image and the position of the point in the second image. Moreover, although the disclosed technologies can perform operations on positions of points on objects in images, because the data affiliated with the images of the location can include information that identifies (at least categorically) the objects, the disclosed technologies can identify, within such data, an object that has one or more of a linear feature or a planar feature. Thus, the disclosed technologies can correct an alignment of positions of points affiliated with such an object in a manner that recognizes that the object has the one or more of the linear feature or the planar feature. Additionally, the disclosed technologies can correct an estimate of a pose of a camera (e.g., attached to a vehicle of the set of vehicles (e.g., a probe vehicle)) that produced an image that included the object.

FIG. 1 includes a diagram that illustrates an example of an environment 100 for producing, from data affiliated with images of a location, but excluding pixel color data, a digital map of the location, according to the disclosed technologies. For example, the environment 100 can include a road 102. For example, the road 102 can include a south portion 104 and a north portion 106. For example, the south portion 104 can be disposed along a line of longitude. For example, the north portion 106 can curve in an easterly direction across a bridge 108. For example, the road 102 can include a lane 110 for southbound traffic and a lane 112 for northbound traffic. For example, the lane 110 can be bounded on the west by a road boundary 114. For example, the lane 112 can be bounded on the east by a road boundary 116. For example, the lane 110 can be bounded on the east and the lane 112 can be bounded on the west by a lane boundary 118. For example, the lane boundary 118 can be a lane marking 120 that indicates a separation between lanes in which streams of traffic flow in opposite directions. For example, the lane marking 120 can be two solid yellow lines.

For example, the environment 100 can include a first road sign 122, a second road sign 124, a third road sign 126, and a fourth road sign 128. For example, the first road sign 122 can be located east of the road boundary 116 at a northern periphery of the south portion 104 of the road 102. For example, the first road sign 122 can be a “Slow” road sign. For example, the second road sign 124 can be located four meters south of the first road sign 122. For example, the second road sign 124 can also be a “Slow” road sign. For example, the third road sign 126 can be located fifteen meters south of the second road sign 124. For example, the third road sign 126 can be a “Scenic Overview” road sign. For example, the fourth road sign 128 can be located thirty meters south of the third road sign 126. For example, the fourth road sign 128 can be a “Speed Limit 25” road sign.

For example, the environment 100 can include a first vehicle 130, a second vehicle 132, and a third vehicle 134. For example, a forward-facing camera 136 can be attached to the first vehicle 130. For example, a forward-facing camera 138 can be attached to the second vehicle 132. For example, a communications device 140 can be disposed on the first vehicle 130. For example, a communications device 142 can be disposed on the second vehicle 132. For example, a communications device 144 can be disposed on the third vehicle 134.

For example, the environment 100 can include a system 146 for producing, from data affiliated with images of a location, a digital map. For example, the system 146 can include a communications device 148.

For example, at a first time ($t_1$), the first vehicle 130 can be located in the lane 112 two meters behind the second road sign 124, the second vehicle 132 can be located in the lane 112 two meters behind the third road sign 126, and third vehicle 134 can be located in the lane 112 about fifteen miles behind the second vehicle 132.

For example, at a second time ($t_2$), the first vehicle 130 can be located in the lane 112 one meter behind the second road sign 124, the second vehicle 132 can be located in the lane 112 one meter behind the third road sign 126, and third vehicle 134 can be located in the lane 112 about fifteen miles behind the second vehicle 132.

As described above, objects in an image can be detected using, for example, object detection techniques and recognized using, for example, object recognition techniques. Semantic information can be affiliated with the objects and objects that qualify as landmarks can be determined. For example, the landmarks can include lane boundaries, road boundaries, signs, or the like.

Figure 2:
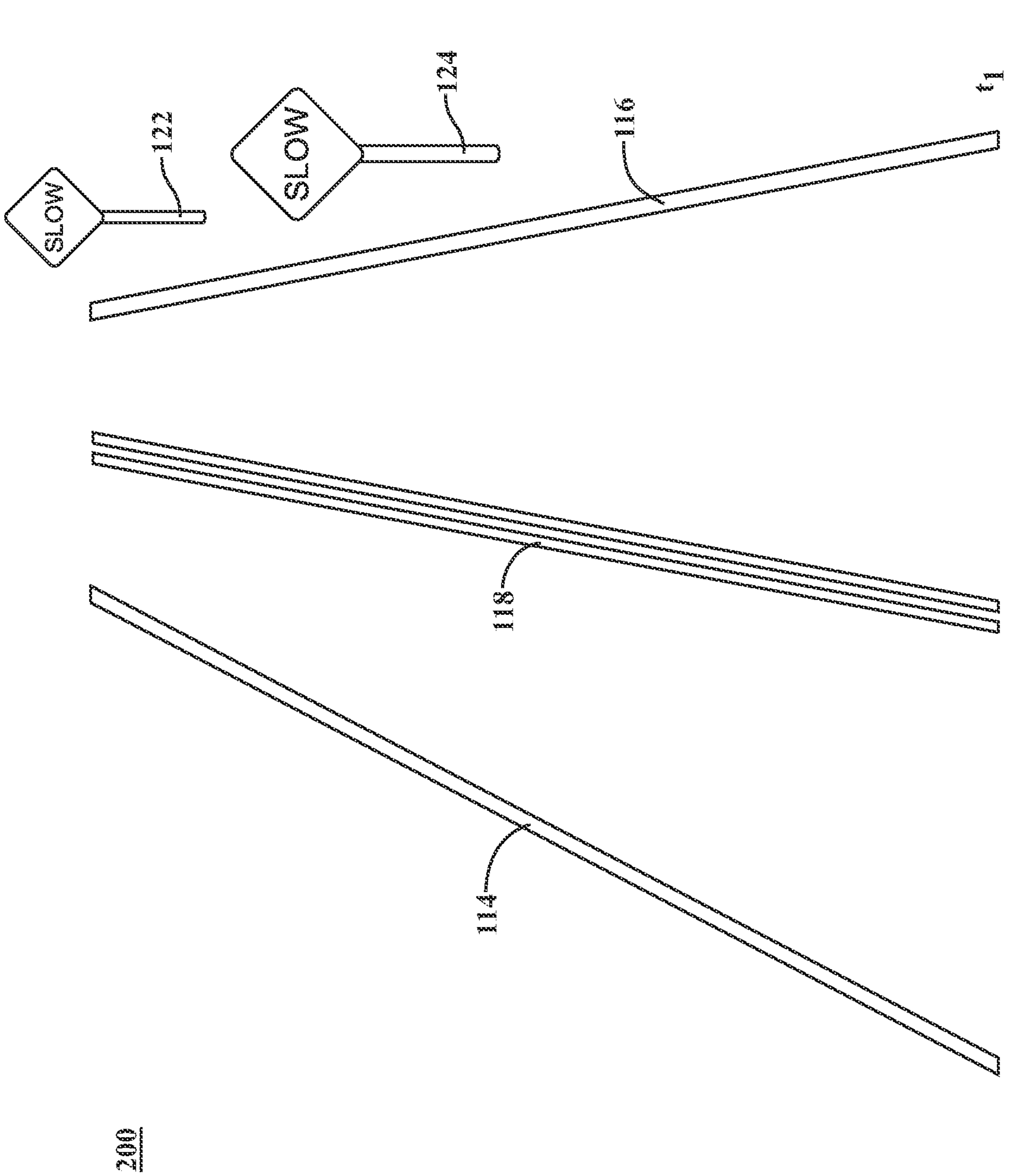
FIG. 2 includes a diagram that illustrates an example of an image produced, at a first time ($t_1$), by a forward-facing camera attached to a first vehicle illustrated in FIG. 1, according to the disclosed technologies.

FIG. 2 includes a diagram that illustrates an example of an image 200 produced, at the first time ($t_1$), by the forward-facing camera 136 attached to the first vehicle 130, according to the disclosed technologies. For example, the image 200 can include the following landmarks: the road boundary 114, the road boundary 116, the lane boundary 118, the first road sign 122, and the second road sign 124.

Figure 3:
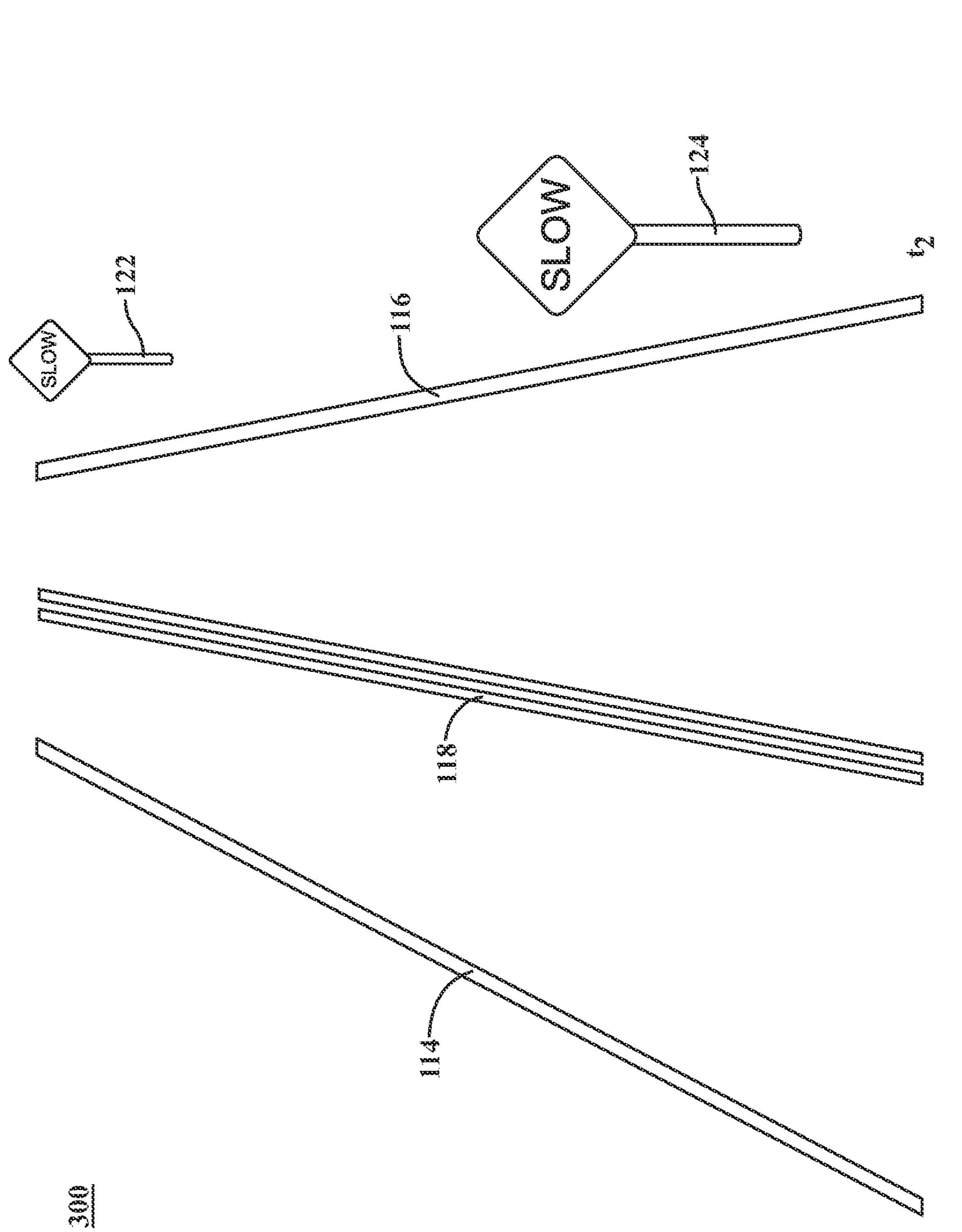
FIG. 3 includes a diagram that illustrates an example of an image produced, at a second time ($t_2$), by the forward-facing camera attached to the first vehicle illustrated in FIG. 1, according to the disclosed technologies.

FIG. 3 includes a diagram that illustrates an example of an image 300 produced, at the second time ($t_2$), by the forward-facing camera 136 attached to the first vehicle 130, according to the disclosed technologies. For example, the image 300 can include the following landmarks: the road boundary 114, the road boundary 116, the lane boundary 118, the first road sign 122, and the second road sign 124.

Figure 4:
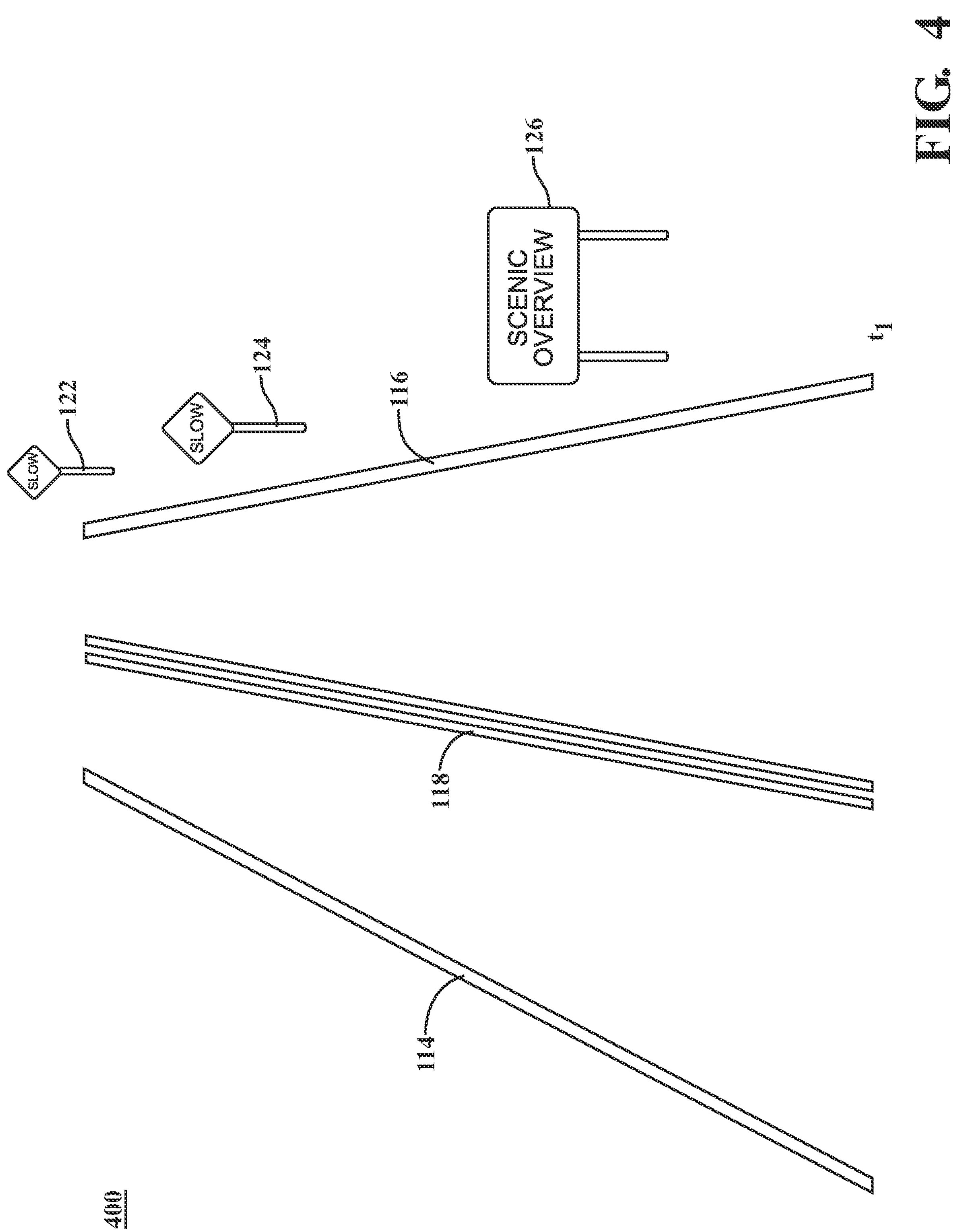
FIG. 4 includes a diagram that illustrates an example of an image produced, at the first time ($t_1$), by a forward-facing camera attached to a second vehicle illustrated in FIG. 1, according to the disclosed technologies.

FIG. 4 includes a diagram that illustrates an example of an image 400 produced, at the first time ($t_1$), by the forward-facing camera 138 attached to the second vehicle 132, according to the disclosed technologies. For example, the image 400 can include the following landmarks: the road boundary 114, the road boundary 116, the lane boundary 118, the first road sign 122, the second road sign 124, and the third road sign 126.

Figure 5:
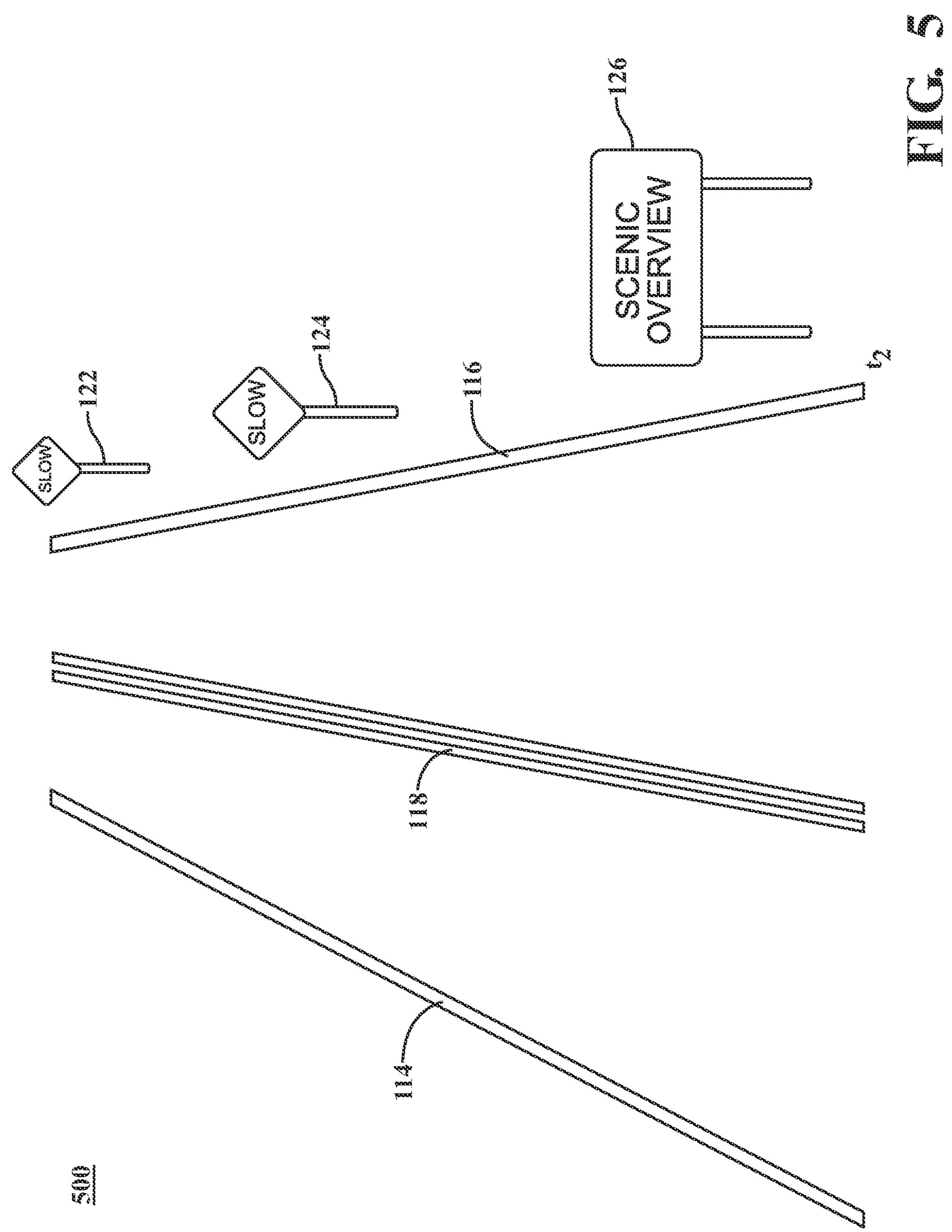
FIG. 5 includes a diagram that illustrates an example of an image produced, at the second time ($t_2$), by the forward-facing camera attached to the second vehicle illustrated in FIG. 1, according to the disclosed technologies.

FIG. 5 includes a diagram that illustrates an example of an image 500 produced, at the second time ($t_2$), by the forward-facing camera 138 attached to the second vehicle 132, according to the disclosed technologies. For example, the image 500 can include the following landmarks: the road boundary 114, the road boundary 116, the lane boundary 118, the first road sign 122, the second road sign 124, and the third road sign 126.

For example, the image 200 and the image 300 can be images in a sequence of images produced by the forward-facing camera 136. Likewise, for example, the image 400 and the image 500 can be images in a sequence of images produced by the forward-facing camera 138. For example, the image 200, the image 300, the image 400, and the image 500 can be produced at a specific production rate. For example, the specific production rate can be ten hertz.

As described above, a position of a landmark can be represented by a position of a point on the landmark. For example, the position of the point on the landmark can be affiliated with a position of a keypoint of an object, in an image, that represents the landmark. A keypoint can be a point in an object that has a potential of being repeatedly detected under different imaging conditions. Keypoints in objects can be extracted using, for example, keypoint extraction techniques.

FIG. 6 includes a diagram that illustrates an example of keypoints 600 of landmarks in the image 200, according to the disclosed technologies. For example, the keypoints 600 can include a first keypoint 602 of the road boundary 114, a second keypoint 604 of the road boundary 116, a third keypoint 606 of the lane boundary 118, a fourth keypoint 608 of the first road sign 122, and a fifth keypoint 610 of the second road sign 124. For example, because only those parts of the road boundary 114, the road boundary 116, and the lane boundary 118 captured by the forward-facing camera 136 are included in the image 200, the first keypoint 602, the second keypoint 604, and the third keypoint 606 can be for those parts of the road boundary 114, the road boundary 116, and the lane boundary 118 captured by the forward-facing camera 170 at the first time ($t_1$).

Figure 7:
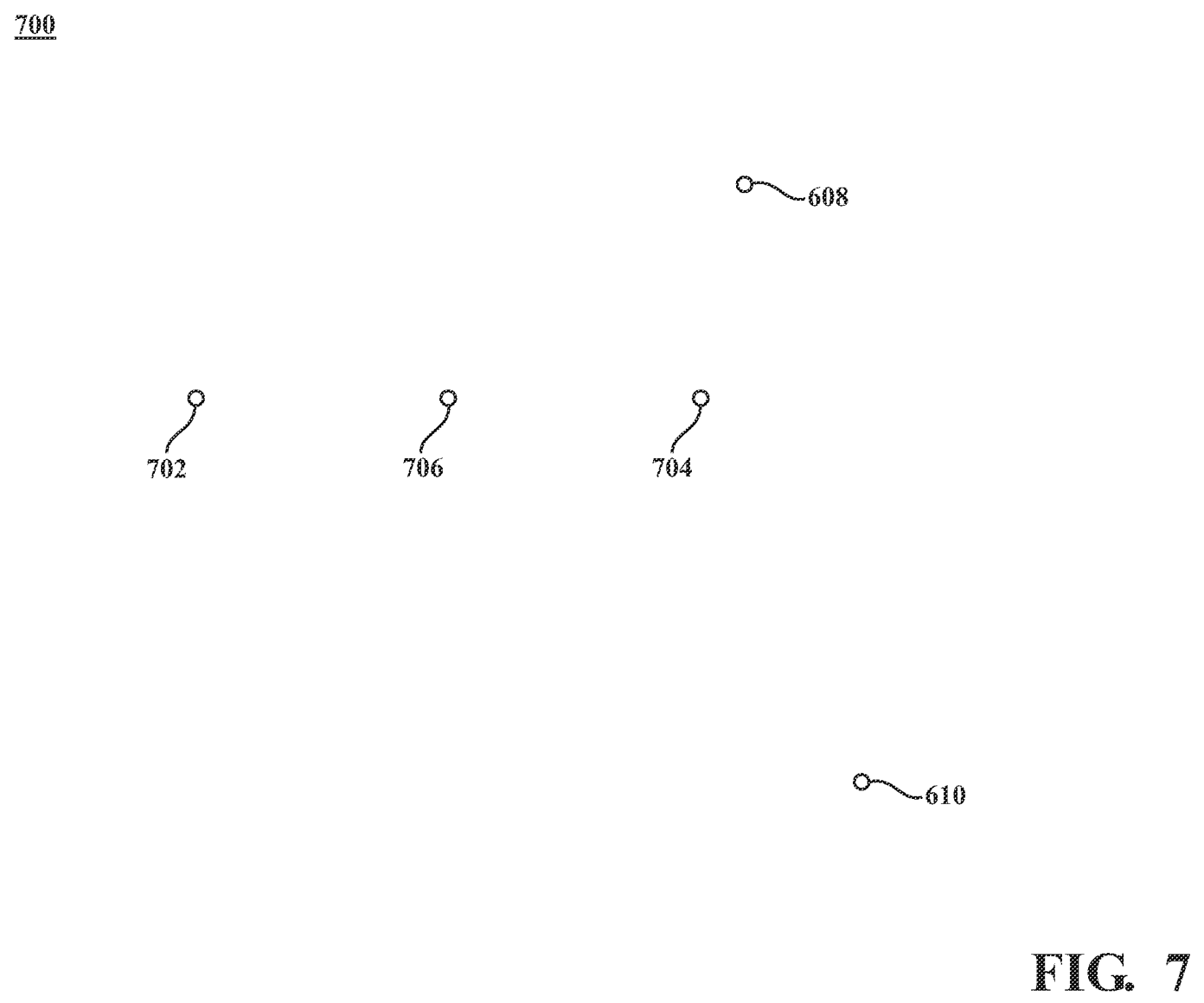

FIG. 7 includes a diagram that illustrates an example of keypoints 700 of landmarks in the image 300, according to the disclosed technologies. For example, the keypoints 700 can include a sixth keypoint 702 of the road boundary 114, a seventh keypoint 704 of the road boundary 116, an eighth keypoint 706 of the lane boundary 118, the fourth keypoint 608 of the first road sign 122, and the fifth keypoint 610 of the second road sign 124. For example, because only those parts of the road boundary 114, the road boundary 116, and the lane boundary 118 captured by the forward-facing camera 136 are included in the image 300, the sixth keypoint 702, the seventh keypoint 704, and the eighth keypoint 706 can be for those parts of the road boundary 114, the road boundary 116, and the lane boundary 118 captured by the forward-facing camera 170 at the second time ($t_2$). Moreover, portions of those parts of the road boundary 114, the road boundary 116, and the lane boundary 118 captured by the forward-facing camera 136 included in the image 300 can be different from portions of those parts of the road boundary 114, the road boundary 116, and the lane boundary 118 captured by the forward-facing camera 136 included in the image 200.

Figure 8:
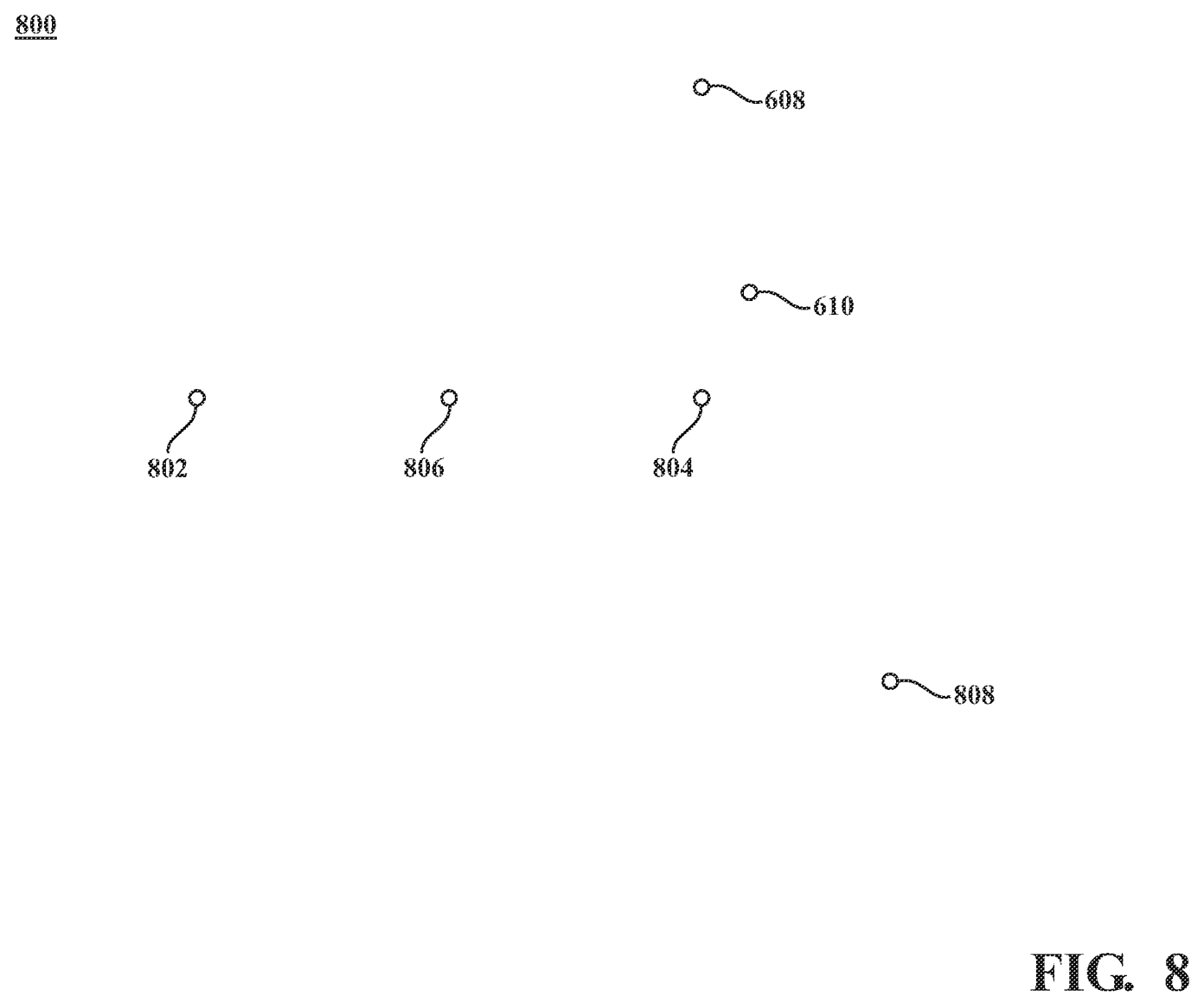

FIG. 8 includes a diagram that illustrates an example of keypoints 800 of landmarks in the image 400, according to the disclosed technologies. For example, the keypoints 800 can include a ninth keypoint 802 of the road boundary 114, a tenth keypoint 804 of the road boundary 116, an eleventh keypoint 806 of the lane boundary 118, the fourth keypoint 608 of the first road sign 122, the fifth keypoint 610 of the second road sign 124, and a twelfth keypoint 808 of the third road sign 126. For example, because only those parts of the road boundary 114, the road boundary 116, and the lane boundary 118 captured by the forward-facing camera 138 are included in the image 400, the ninth keypoint 802, the tenth keypoint 804, and the eleventh keypoint 806 can be for those parts of the road boundary 114, the road boundary 116, and the lane boundary 118 captured by the forward-facing camera 138 at the first time ($t_1$).

Figure 9:
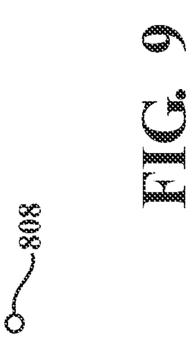
FIG. 9 includes a diagram that illustrates an example of keypoints of landmarks in the image illustrated in FIG. 5, according to the disclosed technologies.

FIG. 9 includes a diagram that illustrates an example of keypoints 900 of landmarks in the image 500, according to the disclosed technologies. For example, the keypoints 900 can include a thirteenth keypoint 902 of the road boundary 114, a fourteenth keypoint 904 of the road boundary 116, a fifteenth keypoint 906 of the lane boundary 118, the fourth keypoint 608 of the first road sign 122, the fifth keypoint 610 of the second road sign 124, and the twelfth keypoint 808 of the third road sign 126. For example, because only those parts of the road boundary 114, the road boundary 116, and the lane boundary 118 captured by the forward-facing camera 138 are included in the image 500, the thirteenth keypoint 902, the fourteenth keypoint 904, and the fifteenth keypoint 906 can be for those parts of the road boundary 114, the road boundary 116, and the lane boundary 118 captured by the forward-facing camera 138 at the second time ($t_2$). Moreover, portions of those parts of the road boundary 114, the road boundary 116, and the lane boundary 118 captured by the forward-facing camera 138 included in the image 500 can be different from portions of those parts of the road boundary 114, the road boundary 116, and the lane boundary 118 captured by the forward-facing camera 138 included in the image 400.

As described above, positions of points (e.g., keypoints) on the landmarks can be determined, for example, using: (1) a pose (i.e., a position and an orientation) of a camera (e.g., attached to a vehicle of the set of vehicles (e.g., the forward-facing camera 136 attached to the first vehicle 130 or the forward-facing camera 138 attached to the second vehicle 132)) and (2) distances and bearings to the landmarks (e.g., keypoints) in the images. The vehicle of the set of vehicles can use, for example, proprioception information (e.g., one or more of GNSS information, IMU information, odometry information, or the like) to estimate the pose of the camera (e.g., attached to the vehicle of the set of vehicles). The vehicle of the set of vehicles can use, for example, as perceptual information, results of a photogrammetric range imaging technique (e.g., an SfM technique) to determine the distances and the bearings to the landmarks (e.g., keypoints) in the images.

As described above, in this manner, data affiliated with the images of a location can, for an image of the images, exclude pixel color data, but include information about: (1) the pose of the camera that produced the image and (2) one or more positions of points (e.g., keypoints) on landmarks in the image. For example, if the landmark is a sign, the data affiliated with the images can include information about the sign. For example, the information about the sign can include: (1) for a center of the sign, a latitude position, a longitude position, and an altitude, (2) a height of the sign, and (3) a width of the sign. Additionally or alternatively, for example, the information about the sign can include information about a message communicated by the sign.

FIGS. 10A and 10B include an example of tables 1000 that illustrate data affiliated with images of a location, according to the disclosed technologies. For example, the location can be the south portion 104 of the road 102 illustrated in FIG. 1. The tables 1000 can include: (1) a first table 1002 that illustrates items of the data affiliated with the image 200 produced, at the first time ($t_1$), by the forward-facing camera 136 attached to the first vehicle 130; (2) a second table 1004 that illustrates items of the data affiliated with the image 300 produced, at the second time ($t_2$), by the forward-facing camera 136 attached to the first vehicle 130; (3) a third table 1006 that illustrates items of the data affiliated with the image 400 produced, at the first time ($t_1$), by the forward-facing camera 138 attached to the second vehicle 132; and (4) a fourth table 1008 that illustrates items of the data affiliated with the image 500 produced, at the second time ($t_2$), by the forward-facing camera 138 attached to the second vehicle 132.

For example: (1) the first table 1002 can include an identification 1010 of the forward-facing camera 136 attached to the first vehicle 130 and a pose 1012 of the forward-facing camera 136 attached to the first vehicle 130 at the first time ($t_1$), (2) the second table 1004 can include the identification 1010 of the forward-facing camera 136 attached to the first vehicle 130 and a pose 1014 of the forward-facing camera 136 attached to the first vehicle 130 at the second time ($t_2$), (3) the third table 1006 can include an identification 1016 of the forward-facing camera 138 attached to the second vehicle 132 and a pose 1018 of the forward-facing camera 138 attached to the second vehicle 132 at the first time ($t_1$), and (4) the fourth table 1008 can include the identification 1016 of the forward-facing camera 138 attached to the second vehicle 132 and a pose 1020 of the forward-facing camera 138 attached to the second vehicle 132 at the second time ($t_2$).

The first table 1002 can include, for example, data affiliated with the first keypoint 602, the second keypoint 604, the third keypoint 606, the fourth keypoint 608, and the fifth keypoint 610. The second table 1004 can include, for example, data affiliated with the sixth keypoint 702, the seventh keypoint 704, the eighth keypoint 706, the fourth keypoint 608, and the fifth keypoint 610. The third table 1006 can include, for example, data affiliated with the ninth keypoint 802, the tenth keypoint 804, the eleventh keypoint 806, the fourth keypoint 608, the fifth keypoint 610, and the twelfth keypoint 808. The fourth table 1008 can include, for example, data affiliated with the thirteenth keypoint 902, the fourteenth keypoint 904, the fifteenth keypoint 906, the fourth keypoint 608, the fifth keypoint 610, and the twelfth keypoint 808.

One or more circumstances affiliated with production of the data affiliated with the images of the location can cause, for example, the information about: (1) the pose of the camera, (2) the one or more positions of the points on the landmarks, or (3) both to include one or more errors. For example, errors in the proprioception information (e.g., the one or more of the GNSS information, the IMU information, the odometry information, or the like) can cause the information about the pose of the camera to include one or more errors. For example, changes in illumination of one or more of the landmarks at one or more of the first time ($t_1$) or the second time ($t_2$) can cause the results the photogrammetric range imaging technique (e.g., the SfM technique) to include one or more errors so that the distances and the bearings to the landmarks (e.g., keypoints) in the images, determined from photogrammetric range imaging technique (e.g., the SfM technique), include one or more errors. One of skill in the art, in light of the description herein, understands that one or more other circumstances can cause one or more other errors to be included in the information about: (1) the pose of the camera, (2) the one or more positions of the points on the landmarks, or (3) both. Individually or cumulatively, these errors can cause information included in an item of the data affiliated with an image produced at one time by a specific source (e.g., the forward-facing camera 136 attached to the first vehicle 130 or the forward-facing camera 138 attached to the second vehicle 132) to be different from a corresponding item of data affiliated with an image produced: (1) at a different time, (2) by a different specific source, or (3) both. This situation is illustrated in values of the items of the data contained in the tables 1000 included in FIGS. 10A and 10B.

As described above, the first vehicle 130, the second vehicle 132, or both can transmit the data affiliated with the images to the system 146 for producing, from the data affiliated with images of the location, the digital map. For example, the communications device 140 disposed on the first vehicle 130 can transmit the data, produced at the first time ($t_1$) and at the second time ($t_2$) (e.g., the first table 1002 and the second table 1004), to the communications device 148 included in the system 146. Likewise, for example, the communications device 142 disposed on the second vehicle 132 can transmit the data, produced at the first time ($t_1$) and at the second time ($t_2$) (e.g., the third table 1006 and the fourth table 1008), to the communications device 148 included in the system 146.

FIG. 11 includes a diagram 1100 that illustrates an example of the positions of the points (e.g., the keypoints) of the landmarks affiliated with the items of the data contained in the tables 1000 included in FIGS. 10A and 10B, according to the disclosed technologies. For example, the diagram 1100 can include: (1) a position 1102 of the first keypoint 602 determined by the first vehicle 130 at the first time ($t_1$), (2) a position 1104 of the second keypoint 604 determined by the first vehicle 130 at the first time ($t_1$), (3) a position 1106 of the third keypoint 606 determined by the first vehicle 130 at the first time ($t_1$), (4) a position 1108 of the fourth keypoint 608 determined by the first vehicle 130 at the first time ($t_1$), (5) a position 1110 of the fifth keypoint 610 determined by the first vehicle 130 at the first time ($t_1$), (6) a position 1112 of the sixth keypoint 702 determined by the first vehicle 130 at the second time ($t_2$), (7) a position 1114 of the seventh keypoint 704 determined by the first vehicle 130 at the second time ($t_2$), (8) a position 1116 of the eighth keypoint 706 determined by the first vehicle 130 at the second time ($t_2$), (9) a position 1118 of the fourth keypoint 608 determined by the first vehicle 130 at the second time ($t_2$), (10) a position 1120 of the fifth keypoint 610 determined by the first vehicle 130 at the second time ($t_2$), (11) a position 1122 of the ninth keypoint 802 determined by the second vehicle 132 at the first time ($t_1$), (12) a position 1124 of the tenth keypoint 804 determined by the second vehicle 132 at the first time ($t_1$), (13) a position 1126 of the eleventh keypoint 806 determined by the second vehicle 132 at the first time ($t_1$), (14) a position 1128 of the fourth keypoint 608 determined by the second vehicle 132 at the first time ($t_1$), (15) a position 1130 of the fifth keypoint 610 determined by the second vehicle 132 at the first time ($t_1$), (16) a position 1132 of the twelfth keypoint 808 determined by the second vehicle 132 at the first time ($t_1$), (17) a position 1134 of the thirteenth keypoint 902 determined by the second vehicle 132 at the second time ($t_2$), (18) a position 1136 of the fourteenth keypoint 904 determined by the second vehicle 132 at the second time ($t_2$), (19) a position 1138 of the fifteenth keypoint 906 determined by the second vehicle 132 at the second time ($t_2$), (20) a position 1140 of the fourth keypoint 608 determined by the second vehicle 132 at the second time ($t_2$), (21) a position 1142 of the fifth keypoint 610 determined by the second vehicle 132 at the second time ($t_2$), and (22) a position 1144 of the twelfth keypoint 808 determined by the second vehicle 132 at the second time ($t_2$).

Figure 12:
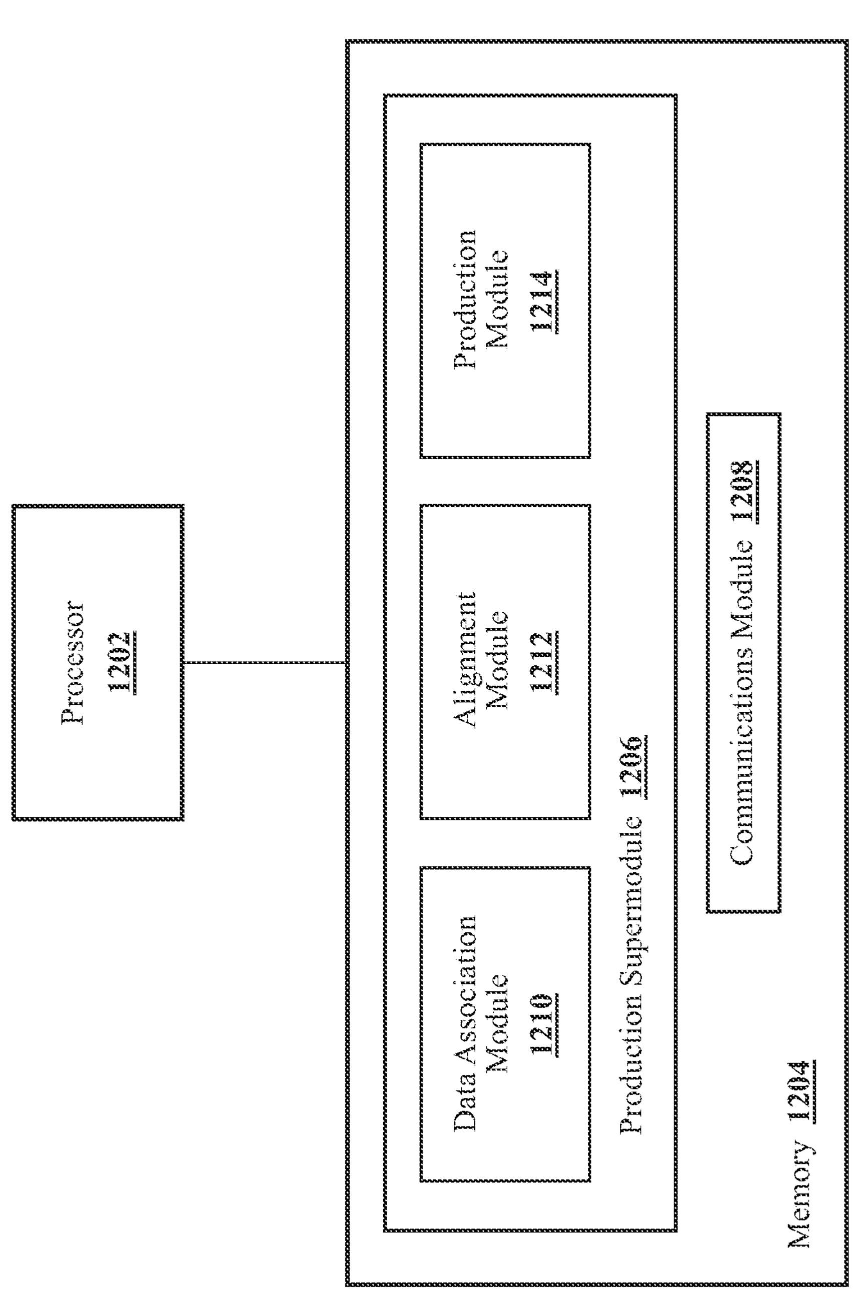
FIG. 12 is a block diagram that illustrates an example of a system for producing, from data affiliated with images of a location, a digital map, according to the disclosed technologies.

FIG. 12 is a block diagram that illustrates an example of a system 1200 for producing, from data affiliated with images of a location, a digital map, according to the disclosed technologies. For example, the system 1200 can be the system 146 illustrated in FIG. 1. The system 1200 can include, for example, a processor 1202 and a memory 1204. The memory 1204 can be communicably coupled to the processor 1202. For example, the memory 1204 can store a production supermodule 1206 and a communications module 1208. For example, the production supermodule 1206 can include a data association module 1210, an alignment module 1212, and a production module 1214.

Figure 13:
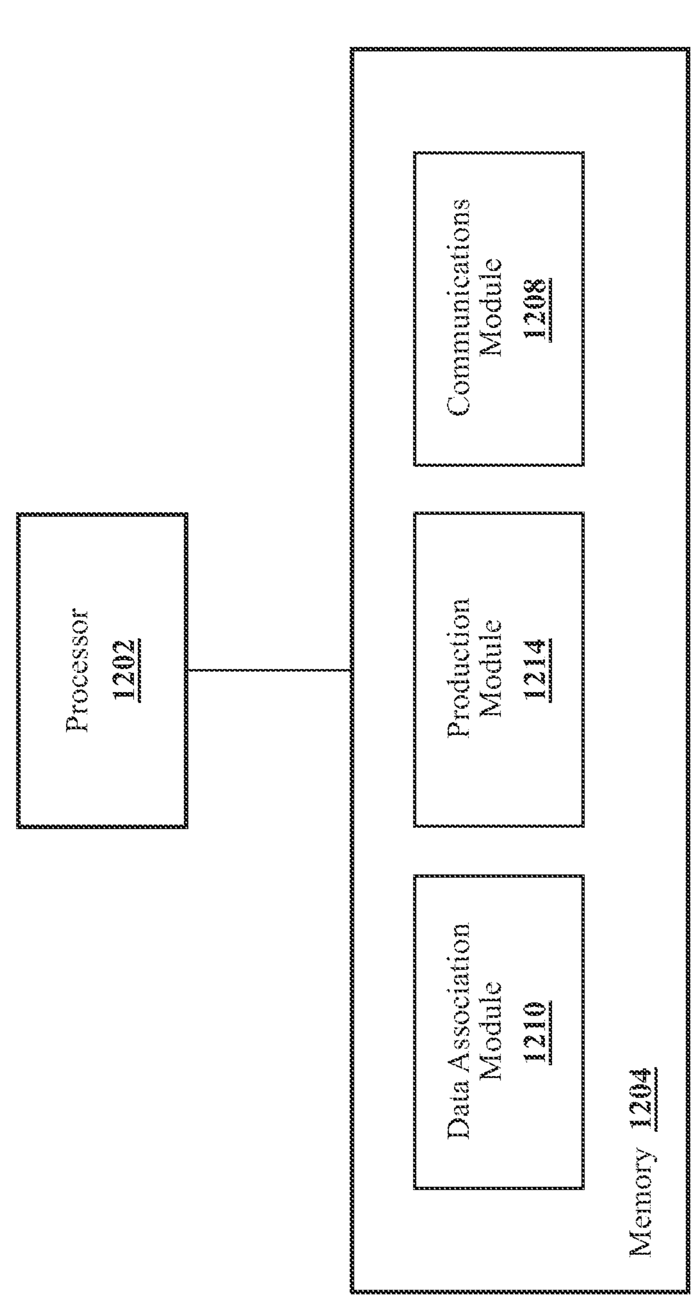
FIG. 13 is a block diagram that illustrates an example of a system for performing data association operations for positions of points that represent objects in images of a location, according to the disclosed technologies.

FIG. 13 is a block diagram that illustrates an example of a system 1300 for performing data association operations for positions of points that represent objects in images of a location, according to the disclosed technologies. The system 1300 can include, for example, the processor 1202 and the memory 1204. For example, the memory 1204 can store the data association module 1210, the production module 1214, and the communications module 1208. For example, the points can include keypoints.

For example, the data association module 1210 can include instructions that function to control the processor 1202 to perform, using a global nearest neighbor technique, a data association operation to determine if the positions of two or more points, of the points, correspond to a same object, of the objects, or to different objects of the objects.

For example, the global nearest neighbor technique can include determining that two or more images, of the images, include two or more objects, of the objects, that are susceptible to being recognized, as a result of a clustering technique, as a single object. With reference to FIGS. 1-5 and 11, for example, each of the image 200, the image 300, the image 400, and the image 500 includes both the first road sign 122 and the second road sign 124. Because: (1) each of the position 1108, the position 1110, the position 1118, the position 1120, the position 1128, the position 1130, the position 1140, and the position 1142 is affiliated with a "Slow" road sign and (2) a distance between the position 1110 and the position 1128 is relatively small (in comparison with distances between other positions illustrated in diagram 1100 included in FIG. 11), the first road sign 122 and the second road sign 124 can be susceptible to being recognized, as a result of a clustering technique, as a single object.

In this example, the global nearest neighbor technique can further include performing the data association operation in a manner so that the result of the global nearest neighbor technique includes a determination that: (1) one or more positions of one or more first points, of the two or more points, correspond to a first object of the two or more objects and (2) one or more positions of one or more second points, of the two or more points, correspond to a second object of the two or more objects. For example, if the two or more points include the position 1108, the position 1110, the position 1118, the position 1120, the position 1128, the position 1130, the position 1140, and the position 1142, then the global nearest neighbor technique can perform the data association operation in a manner so that: (1) the position 1108, the position 1118, the position 1128, and the position 1140 are associated with the first road sign 122 and (2) the position 1110, the position 1120, the position 1130, and the position 1142 are associated with the road sign 124.

Alternatively, for example, the global nearest neighbor technique can include determining that two or more images, of the images, include a single object, of the objects, that is susceptible to being recognized, as a result of a clustering technique, as two or more objects. For example, each of the image 400 and the image 500 includes the third road sign 126. Because a distance between the position 1132 and the position 1144 is relatively large (in comparison with distances between other positions illustrated in diagram 1100 included in FIG. 11), the third road sign 126 can be susceptible to being recognized, as a result of a clustering technique, as two objects.

In this example, the global nearest neighbor technique can further include performing the data association operation in a manner so that the result of the global nearest neighbor technique includes a determination that: (1) one or more positions of one or more first points, of the two or more points, correspond to the single object and (2) one or more positions of one or more second points, of two or more points, correspond to the single object. For example, if the two or more points include the position 1132 and the position 1144, then the global nearest neighbor technique can perform the data association operation in a manner so that both the position 1132 and the position 1144 are associated with the third road sign 126.

In another example, the points can include a first set of points and a second set of points. The first set of points can have been produced at a first time. The second set of points can have been produced at a second time. One or more first points, of the two or more points, can be included in the first set of points. One or more second points, of the two or more points, can be included in the second set of points.

In this example, the global nearest neighbor technique can be configured to assign a time difference between the one or more first points and the one or more second points. For example, if the first time is earlier than the second time and the global nearest neighbor technique determines that historically determined positions have been demonstrated to be more accurate than recently determined positions, then the global nearest neighbor technique can favor the one or more first points. Conversely, if the first time is earlier than the second time and the global nearest neighbor technique determines that recently determined positions have been demonstrated to be more accurate than historically determined positions, then the global nearest neighbor technique can favor the one or more second points.

With reference to FIG. 11, for example: (1) the first set of points can include one or more of the position 1102, the position 1104, the position 1106, the position 1108, the position 1110, the position 1122, the position 1124, the position 1126, the position 1128, the position 1130, and the position 1132 and (2) the second set of points can include one or more of the position 1112, the position 1114, the position 1116, the position 1118, the position 1120, the position 1134, the position 1136, the position 1138, the position 1140, the position 1142, and the position 1144.

Alternatively, for example, the points can include a first set of points and a second set of points. The first set of points can have been produced by a camera attached to a first vehicle of a set of vehicles. The second set of points can have been produced by a camera attached to a second vehicle of the set of vehicles. One or more first points, of the two or more points, can be included in the first set of points. One or more second points, of the two or more points, can be included in the second set of points.

In this example, the global nearest neighbor technique can be configured to assign an averaged measurement of accuracy of the one or more first points and the one or more second points. For example, if the degree of accuracy of the positions of the points produced by the camera attached to the first vehicle of the set of vehicles is greater than the degree of accuracy of the positions of the points produced by the camera attached to the second vehicle of the set of vehicles, then the global nearest neighbor technique can favor the positions of the points produced by the camera attached to the first vehicle of the set of vehicles.

With reference to FIGS. 1 and 11, for example: (1) the first set of points can include one or more of the position 1102, the position 1104, the position 1106, the position 1108, the position 1110, the position 1112, the position 1114, the position 1116, the position 1118, and the position 1120 and (2) the second set of points can include one or more of the position 1122, the position 1124, the position 1126, the position 1128, the position 1130, the position 1132, the position 1134, the position 1136, the position 1138, the position 1140, the position 1142, and the position 1144. For example, if the degree of accuracy of the positions of the points produced by the forward-facing camera 136 attached to the first vehicle 130 is greater than the degree of accuracy of the positions of the points produced by the forward-facing camera 138 attached to the second vehicle 132, then the value of the first weight can be greater than the value of the second weight.

In yet another example, the global nearest neighbor technique can be configured to determine one or more of a Euclidean distance or a Mahalanobis distance. The one or more of the Euclidean distance or the Mahalanobis distance can be between a first point, of the points, and a second point of the points.

For example, a specific object, in the images of the location, can be a road. A covariance matrix, affiliated with the Mahalanobis distance, can have a shape of a prolate spheroid. A first principal component axis, of the prolate spheroid of the covariance matrix, can correspond to a longitudinal direction of the road. A second principal component axis, of the prolate spheroid of the covariance matrix, can correspond to a lateral direction across the road. A third principal component axis, of the prolate spheroid of the covariance matrix, can correspond to a vertical direction above the road. A measurement of the prolate spheroid along the first principal component axis can be longer than a measurement of the prolate spheroid along the second principal component axis and along the third principal component axis. In this manner, a determination of the Mahalanobis distance can allow for a distance between the first point and the second point that is greater in the longitudinal direction than in the lateral direction or the vertical direction because two points aligned in the longitudinal direction, even though separated by a specific distance that is relatively large, can be more likely associated with a same object than two points aligned in the lateral direction or the vertical direction and separated by the specific distance.

In still another example, the global nearest neighbor technique can be configured to use the Hungarian algorithm.

In yet another example, the points can include: (1) a first set of points and (2) a second set of points. The global nearest neighbor technique can be configured to: (1) determine a Euclidean distance and (2) determine, in response to the Euclidean distance being less than a threshold distance, a Mahalanobis distance. The Euclidean distance can be between a specific point, of the first set of points, and a specific point of the second set of points. The Mahalanobis distance can be between the specific point, of the first set of points, and the specific point of the second set of points.

Figure 14:
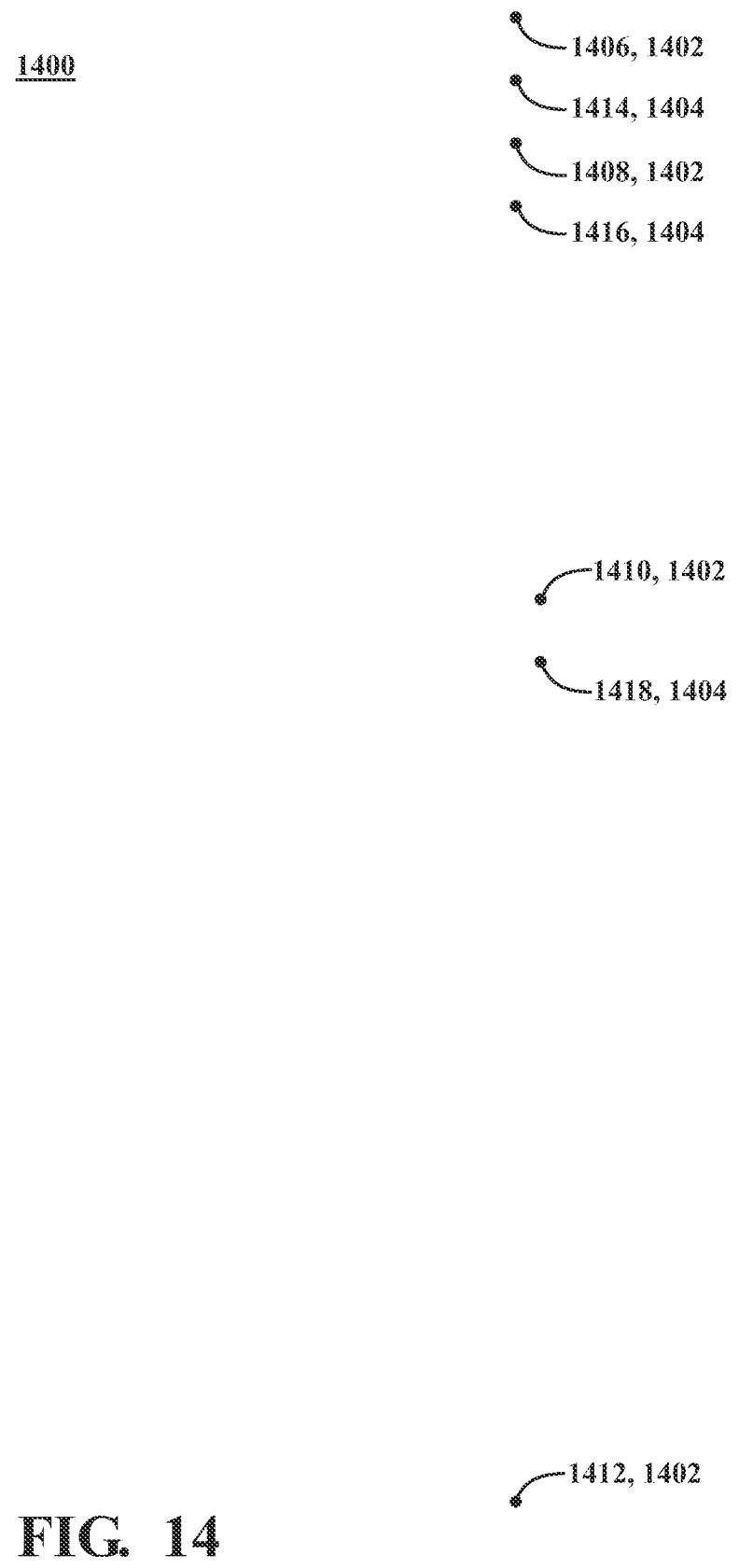

FIG. 14 includes a diagram 1400 that illustrates a first example of positions of points affiliated with a data association determination, according to the disclosed technologies. For example, the points illustrated in the diagram 1400 can be affiliated with the road signs illustrated in the environment 100 included in FIG. 1. For example, the points illustrated in the diagram 1400 can include a first set of points 1402 and a second set of points 1404. For example, the first set of points 1402 can have been used to produce an existing digital map and can include: (1) a point 1406 affiliated with the first road sign 122, (2) a point 1408 affiliated with the second road sign 124, (3) a point 1410 affiliated with the third road sign 126, and (4) a point 1412 affiliated with the fourth road sign 128. For example, the second set of points 1404 can have been determined from the image 400 produced, at the first time ($t_1$), by the forward-facing camera 138 attached to the second vehicle 132 and can include: (1) a point 1414 affiliated with the first road sign 122, (2) a point 1416 affiliated with the second road sign 124, and (3) a point 1418 affiliated with the third road sign 126.

For example, a Euclidean distance can be determined between each of: (1) the point 1406 and the point 1414, (2) the point 1406 and the point 1416, (3) the point 1406 and the point 1418, (4) the point 1408 and the point 1414, (5) the point 1408 and the point 1416, (6) the point 1408 and the point 1418, (7) the point 1410 and the point 1414, (8) the point 1410 and the point 1416, (9) the point 1410 and the point 1418, (10) the point 1412 and the point 1414, (11) the point 1412 and the point 1416, and (12) the point 1412 and the point 1418. For example, the Euclidean distance between each of: (1) the point 1406 and the point 1414, (2) the point 1406 and the point 1416, (3) the point 1406 and the point 1418, (4) the point 1408 and the point 1414, (5) the point 1408 and the point 1416, (6) the point 1408 and the point 1418, (7) the point 1410 and the point 1414, (8) the point 1410 and the point 1416, and (9) the point 1410 and the point 1418 can be less than the threshold distance; and the Euclidean distance between each of: (1) the point 1412 and the point 1414, (2) the point 1412 and the point 1416, and (3) the point 1412 and the point 1418 can be greater than the threshold distance. Accordingly, for example, a Mahalanobis distance can be determined between each of: (1) the point 1406 and the point 1414, (2) the point 1406 and the point 1416, (3) the point 1406 and the point 1418. (4) the point 1408 and the point 1414, (5) the point 1408 and the point 1416, (6) the point 1408 and the point 1418, (7) the point 1410 and the point 1414, (8) the point 1410 and the point 1416, and (9) the point 1410 and the point 1418.

In still another example, the points can include: (1) a set of points for consideration and (2) a set of points included in an existing digital map. The global nearest neighbor technique can be configured to: (1) determine a value of a cost of matching a specific point, of the set of points for consideration, and a specific point of the set of points included in the existing digital map, (2) perform, in response to the value being less than a threshold value, a clustering technique for the specific point, of the set of points for consideration, and the specific point of the set of points included in the existing digital map, and (3) add, in response to the value being other than less than the threshold value, the specific point, of the set of points for consideration, to the existing digital map to produce an updated digital map. For example, the cost of matching can be a Mahalanobis distance between the specific point, of the set of points for consideration, and the specific point of the set of points included in the existing digital map. Additionally, for example, in response to: (1) the specific point, of the set of points for consideration, being affiliated with a first type of object, (2) the specific point, of the set of points included in the existing digital map, being affiliated with a second type of object, and (3) the second type of object being different from the first type of object, a value of the cost of matching between the specific point, of the set of points for consideration, and the specific point, of the set of points included in the existing digital map, can be assigned to an infinite (or very large) value to prevent data association between the specific point, of the set of points for consideration, and the specific point of the set of points included in the existing digital map.

FIG. 15 includes a diagram 1500 that illustrates a second example of positions of points affiliated with a data association determination, according to the disclosed technologies. For example, the points illustrated in the diagram 1500 can be affiliated with the road signs illustrated in the environment 100 included in FIG. 1. For example, the points illustrated in the diagram 1500 can include: (1) a set of points for consideration 1502 and (2) a set of points included in an existing digital map 1504. For example, the set of points for consideration 1502 can have been determined from: (1) the image 200 produced, at the first time ($t_1$), by the forward-facing camera 136 attached to the first vehicle 130 and (2) the image 400 produced, at the first time ($t_1$), by the forward-facing camera 138 attached to the second vehicle 132. For example, the set of points for consideration 1502 can include: (1) a point 1506 determined, at the first time ($t_1$), by the forward-facing camera 136 and affiliated with the first road sign 122. (2) a point 1508 determined, at the first time ($t_1$), by the forward-facing camera 136 and affiliated with the second road sign 124, (3) a point 1510 determined, at the first time ($t_1$), by the forward-facing camera 138 and affiliated with the first road sign 122, (4) a point 1512 determined, at the first time ($t_1$), by the forward-facing camera 138 and affiliated with the second road sign 124, and (5) a point 1514 determined, at the first time ($t_1$), by the forward-facing camera 138 and affiliated with the third road sign 126. For example, the set of points included in the existing digital map 1504 can include: (1) a point 1516 affiliated with the second road sign 124 and (2) a point 1518 affiliated with the third road sign 126 (e.g., the first road sign 122 can have been installed at a time after a time at which the existing digital map 1504 was produced).

For example, a value of a cost of matching can be determined between each of: (1) the point 1506 and the point 1516, (2) the point 1506 and the point 1518, (3) the point 1508 and the point 1516, (4) the point 1508 and the point 1518. (5) the point 1510 and the point 1516, (6) the point 1510 and the point 1518, (7) the point 1512 and the point 1516, (8) the point 1512 and the point 1518, (9) the point 1514 and the point 1516, and (10) the point 1514 and the point 1518.

Additionally, with reference to FIGS. 10A, 10B, and 15, for example, because: (1) the point 1506 is affiliated with the first road sign 122, which has sign_type: _slow, (2) the point 1508 is affiliated with the second road sign 124, which has sign_type: _slow, (3) the point 1510 is affiliated with the first road sign 122, which has sign_type: _slow, (4) the point 1512 is affiliated with the second road sign 124, which has sign_type: slow, (5) the point 1514 is affiliated with the third road sign 126, which has sign_type: _scenic_overview, (6) the point 1516 is affiliated with the second road sign 124, which has sign_type: _slow, and (7) the point 1518 is affiliated with the third road sign 126, which has sign_type: _scenic_overview, the value of the cost of matching between each of: (1) the point 1506 and the point 1518, (2) the point 1508 and the point 1518, (3) the point 1510 and the point 1518. (4) the point 1512 and the point 1518, and (5) the point 1514 and the point 1516, can be assigned to an infinite (or very large) value.

For example, the value of the cost of matching between each of: (1) the point 1508 and the point 1516, (2) the point 1512 and the point 1516, and (3) the point 1514 and the point 1518 can be less than the threshold value; and the value of the cost of matching between each of: (1) the point 1506 and the point 1516, (2) the point 1506 and the point 1518. (3) the point 1508 and the point 1518, (4) the point 1510 and the point 1516, (5) the point 1510 and the point 1518, (6) the point 1512 and the point 1518, and (7) the point 1514 and the point 1516 can be other than less than the threshold value. Accordingly, for example, a clustering technique can be performed between each of: (1) the point 1508 and the point 1516, (2) the point 1512 and the point 1516, and (3) the point 1514 and the point 1518. Moreover, for example, each of: (1) the point 1506 and (2) the point 1510 can be added to the existing digital map to produce an updated digital map.

Additionally, in this example, the points can further include: (1) a first set of points and (2) a second set of points. The global nearest neighbor technique can be further configured to: (1) determine a first count, (2) determine a second count, and (3) designate, in response to the first count being greater than the second count, the first set of points as an initial set of points for consideration. The first count can be of a number of points in the first set of points. The second count can be of a number of points in the second set of points.

For example, the set of points for consideration 1502 can include a first set of points 1520 and a second set of points 1522. For example, the first set of points 1520 can have been determined from the image 400 produced, at the first time ($t_1$), by the forward-facing camera 138 attached to the second vehicle 132 and can include: (1) the point 1510, (2) the point 1512, and (3) the point 1514. For example, the second set of points 1522 can have been determined from the image 200 produced, at the first time ($t_1$), by the forward-facing camera 136 attached to the first vehicle 130 and can include: (1) the point 1506 and (2) the point 1508. The first count can be determined to be three. The second count can be determined to be two. In response to the first count being greater than the second count, the first set of points 1520 can be designated as an initial set of points for consideration.

Returning to FIG. 13, for example, the production module 1214 can include instructions that function to control the processor 1202 to produce, based on a result of the global nearest neighbor technique, a digital map of the location.

FIG. 16 includes an example of a digital map 1600, according to the disclosed technologies. For example, the digital map 1600 can include representations of the position of: (1) the road boundary 114 (based on the position 1102, the position 1112, the position 1122, and the position 1134), (2) the road boundary 116 (based on the position 1104, the position 1114, the position 1124, and the position 1136), (3) the lane boundary 118 (based on the position 1106, the position 1116, the position 1126, and the position 1138), (4) the first road sign 122 (based on the position 1108, the position 1118, the position 1128, and the position 1140), (5) the second road sign 124 (based on the position 1110, the position 1120, the position 1130, and the position 1142), and (6) the third road sign 126 (based on the position 1132 and the position 1144).

Returning to FIG. 13, for example, the communications module 1208 can include instructions that function to control the processor 1202 to transmit the digital map to a specific vehicle to be used to control a movement of the specific vehicle. With reference to FIG. 1, for example, the instructions to cause the processor 1202 to transmit the digital map can cause the communications device 148 included in the system 146 to transmit the digital map to the communications device 144 disposed on the third vehicle 134.

Returning to FIG. 13, additionally, for example, the communications module 1208 can include instructions that function to control the processor 1202 to receive, from a set of vehicles, the positions of the points. With reference to FIG. 1, for example, the instructions to cause the processor 1202 to receive the positions of the points can cause the communications device 148 included in the system 146 to receive the positions of the points from the communications device 140 disposed on the first vehicle 130, the communications device 142 disposed on the second vehicle 132, or both.

For example, the instructions to receive can include instructions to receive, from a vehicle of the set of vehicles and at a specific communication rate, the positions of the points affiliated with a batch of images produced by a camera attached to the vehicle. For example, the specific communication rate can be once per thirty seconds. For example, the positions of the points can be determined by an automated driving system of active safety technologies and advanced driver assistance systems (ADAS). For example, the automated driving system can be a third generation of the Toyota Safety Sense™ system (TSS3). For example, the images produced by the camera can be produced at a specific production rate. For example, the specific production rate can be ten hertz.

Figure 17:
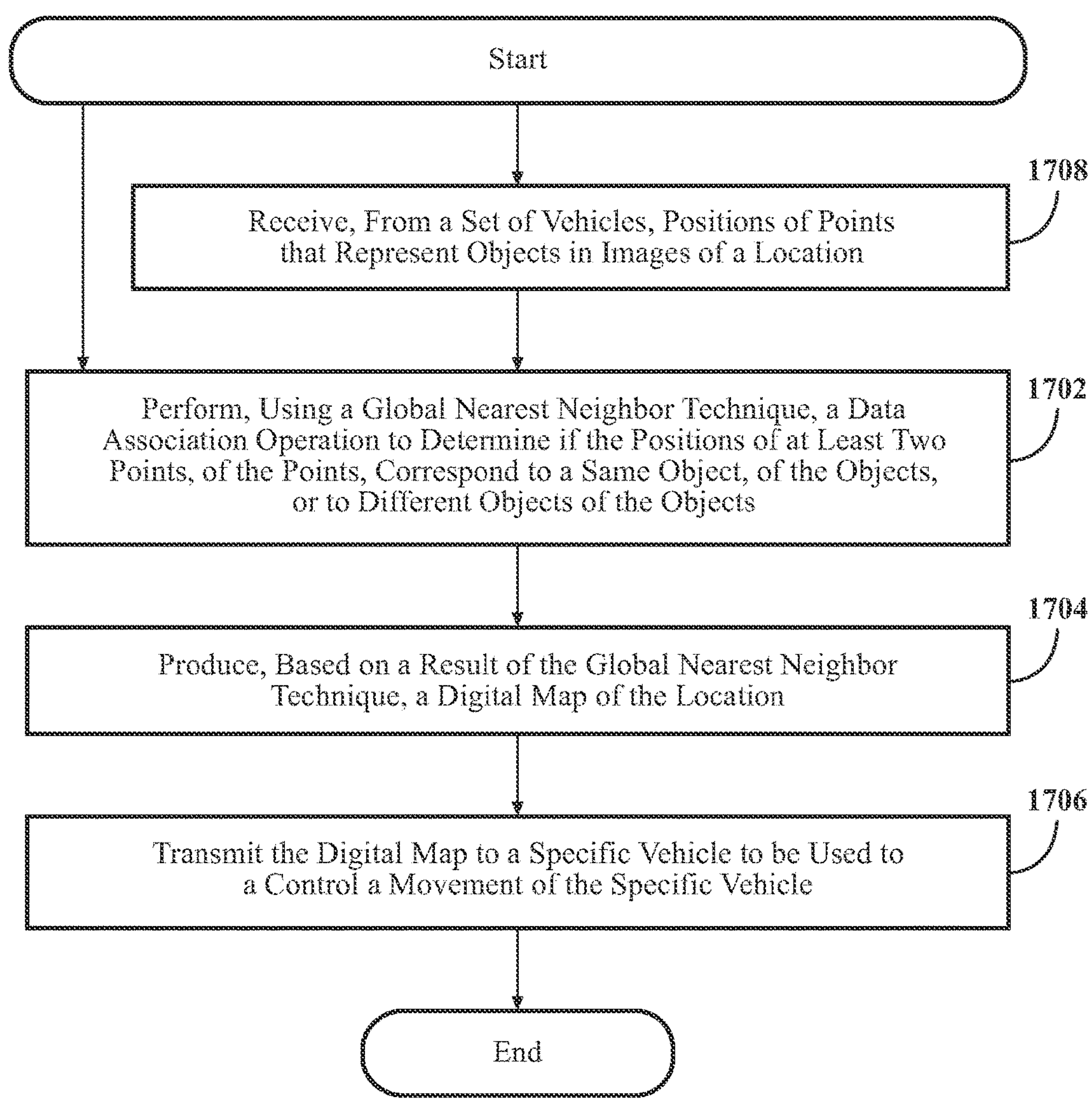
FIG. 17 includes a flow diagram that illustrates an example of a method that is associated with performing data association operations for positions of points that represent objects in images of a location, according to the disclosed technologies.

FIG. 17 includes a flow diagram that illustrates an example of a method 1700 that is associated with performing data association operations for positions of points that represent objects in images of a location, according to the disclosed technologies. For example, the points can include keypoints. Although the method 1700 is described in combination with the system 1300 illustrated in FIG. 13, one of skill in the art understands, in light of the description herein, that the method 1700 is not limited to being implemented by the system 1300 illustrated in FIG. 13. Rather, the system 1300 illustrated in FIG. 13 is an example of a system that may be used to implement the method 1700. Additionally, although the method 1700 is illustrated as a generally serial process, various aspects of the method 1700 may be able to be executed in parallel.

In the method 1700, at an operation 1702, for example, the data association module 1210 can perform, using a global nearest neighbor technique, a data association operation to determine if the positions of two or more points, of the points, correspond to a same object, of the objects, or to different objects of the objects.

For example, the global nearest neighbor technique can include determining that two or more images, of the images, include two or more objects, of the objects, that are susceptible to being recognized, as a result of a clustering technique, as a single object.

In this example, the global nearest neighbor technique can further include performing the data association operation in a manner so that the result of the global nearest neighbor technique includes a determination that: (1) one or more positions of one or more first points, of the two or more points, correspond to a first object of the two or more objects and (2) one or more positions of one or more second points, of the two or more points, correspond to a second object of the two or more objects.

Alternatively, for example, the global nearest neighbor technique can include determining that two or more images, of the images, include a single object, of the objects, that is susceptible to being recognized, as a result of a clustering technique, as two or more objects.

In this example, the global nearest neighbor technique can further include performing the data association operation in a manner so that the result of the global nearest neighbor technique includes a determination that: (1) one or more positions of one or more first points, of the two or more points, correspond to the single object and (2) one or more positions of one or more second points, of two or more points, correspond to the single object.

In another example, the points can include a first set of points and a second set of points. The first set of points can have been produced at a first time. The second set of points can have been produced at a second time. One or more first points, of the two or more points, can be included in the first set of points. One or more second points, of the two or more points, can be included in the second set of points.

In this example, the global nearest neighbor technique can be configured to assign a time difference between the one or more first points and the one or more second points. For example, if the first time is earlier than the second time and the global nearest neighbor technique determines that historically determined positions have been demonstrated to be more accurate than recently determined positions, then the global nearest neighbor technique can favor the one or more first points. Conversely, if the first time is earlier than the second time and the global nearest neighbor technique determines that recently determined positions have been demonstrated to be more accurate than historically determined positions, then the global nearest neighbor technique can favor the one or more second points.

Alternatively, for example, the points can include a first set of points and a second set of points. The first set of points can have been produced by a camera attached to a first vehicle of a set of vehicles. The second set of points can have been produced by a camera attached to a second vehicle of the set of vehicles. One or more first points, of the two or more points, can be included in the first set of points. One or more second points, of the two or more points, can be included in the second set of points.

In this example, the global nearest neighbor technique can be configured to assign an averaged measurement of accuracy of the one or more first points and the one or more second points. For example, if the degree of accuracy of the positions of the points produced by the camera attached to the first vehicle of the set of vehicles is greater than the degree of accuracy of the positions of the points produced by the camera attached to the second vehicle of the set of vehicles, then the global nearest neighbor technique can favor the positions of the points produced by the camera attached to the first vehicle of the set of vehicles.

In yet another example, the global nearest neighbor technique can be configured to determine one or more of a Euclidean distance or a Mahalanobis distance. The one or more of the Euclidean distance or the Mahalanobis distance can be between a first point, of the points, and a second point of the points.

For example, a specific object, in the images of the location, can be a road. A covariance matrix, affiliated with the Mahalanobis distance, can have a shape of a prolate spheroid. A first principal component axis, of the prolate spheroid of the covariance matrix, can correspond to a longitudinal direction of the road. A second principal component axis, of the prolate spheroid of the covariance matrix, can correspond to a lateral direction across the road. A third principal component axis, of the prolate spheroid of the covariance matrix, can correspond to a vertical direction above the road. A measurement of the prolate spheroid along the first principal component axis can be longer than a measurement of the prolate spheroid along the second principal component axis and along the third principal component axis. In this manner, a determination of the Mahalanobis distance can allow for a distance between the first point and the second point that is greater in the longitudinal direction than in the lateral direction or the vertical direction because two points aligned in the longitudinal direction, even though separated by a specific distance that is relatively large, can be more likely associated with a same object than two points aligned in the lateral direction or the vertical direction and separated by the specific distance.

In still another example, the global nearest neighbor technique can be configured to use the Hungarian algorithm.

In yet another example, the points can include: (1) a first set of points and (2) a second set of points. The global nearest neighbor technique can be configured to: (1) determine a Euclidean distance and (2) determine, in response to the Euclidean distance being less than a threshold distance, a Mahalanobis distance. The Euclidean distance can be between a specific point, of the first set of points, and a specific point of the second set of points. The Mahalanobis distance can be between the specific point, of the first set of points, and the specific point of the second set of points.

In still another example, the points can include: (1) a set of points for consideration and (2) a set of points included in an existing digital map. The global nearest neighbor technique can be configured to: (1) determine a value of a cost of matching a specific point, of the set of points for consideration, and a specific point of the set of points included in the existing digital map, (2) perform, in response to the value being less than a threshold value, a clustering technique for the specific point, of the set of points for consideration, and the specific point of the set of points included in the existing digital map, and (3) add, in response to the value being other than less than the threshold value, the specific point, of the set of points for consideration, to the existing digital map to produce an updated digital map.

Additionally, in this example, the points can further include: (1) a first set of points and (2) a second set of points. The global nearest neighbor technique can be further configured to: (1) determine a first count, (2) determine a second count, and (3) designate, in response to the first count being greater than the second count, the first set of points as an initial set of points for consideration. The first count can be of a number of points in the first set of points. The second count can be of a number of points in the second set of points.

At an operation 1704, for example, the production module 1214 can produce, based on a result of the global nearest neighbor technique, a digital map of the location.

At an operation 1706, for example, the communications module 1208 can transmit the digital map to a specific vehicle to be used to control a movement of the specific vehicle.

At an operation 1708, for example, the communications module 1208 can receive, from a set of vehicles, the positions of the points.

For example, in the operation 1708, the communications module 1208 can receive, from a vehicle of the set of vehicles and at a specific communication rate, the positions of the points affiliated with a batch of images produced by a camera attached to the vehicle. For example, the specific communication rate can be once per thirty seconds. For example, the positions of the points can be determined by an automated driving system of active safety technologies and advanced driver assistance systems (ADAS). For example, the automated driving system can be a third generation of the Toyota Safety Sense™ system (TSS3). For example, the images produced by the camera can be produced at a specific production rate. For example, the specific production rate can be ten hertz.

Figure 18:
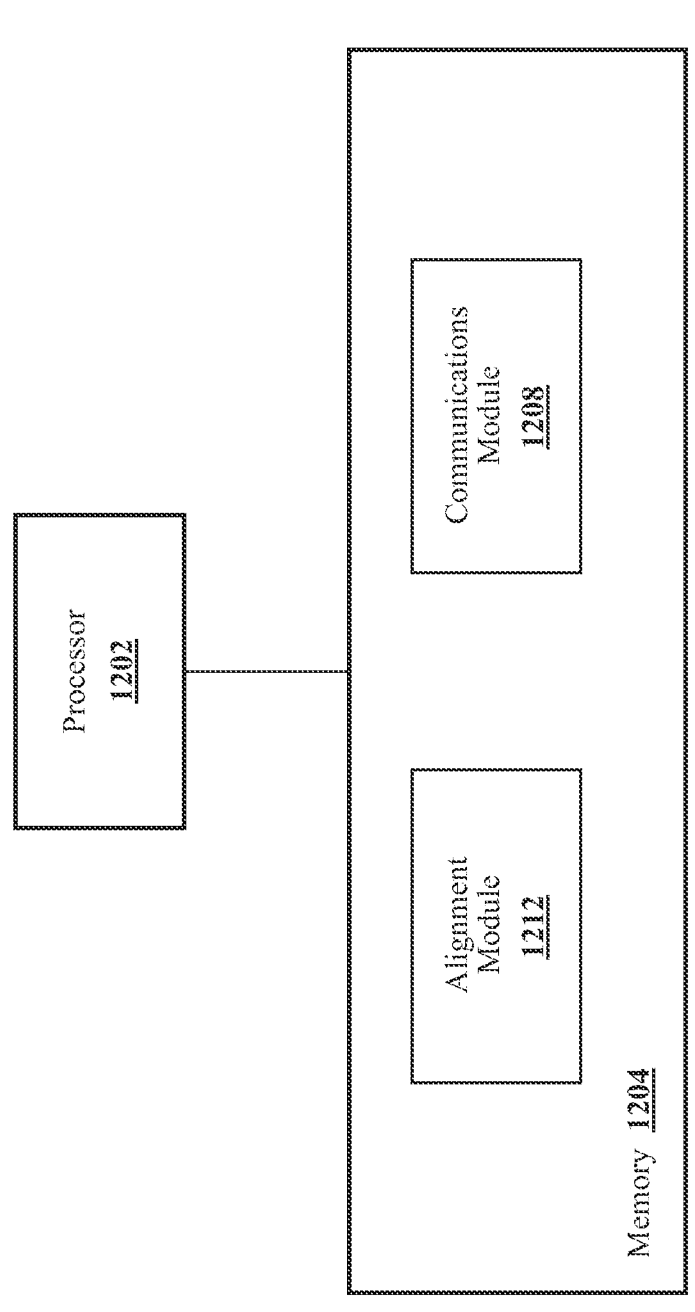
FIG. 18 is a block diagram that illustrates an example of a system for correcting an alignment of positions of points affiliated with an object, in images of a location, that has one or more of a linear feature or a planar feature, according to the disclosed technologies.

FIG. 18 is a block diagram that illustrates an example of a system 1800 for correcting an alignment of positions of points affiliated with an object, in images of a location, that has one or more of a linear feature or a planar feature, according to the disclosed technologies. The system 1800 can include, for example, the processor 1202 and the memory 1204. For example, the memory 1204 can store the alignment module 1212 and the communications module 1208. For example, the points can include keypoints.

For example, the alignment module 1212 can include instructions that function to control the processor 1202 to identify, within data affiliated with the images of the location, the positions of the points affiliated with the object, in the images, that has the one or more of the linear feature or the planar feature. For example, the data affiliated with the images can further include information that identifies the object as having the one or more of the linear feature or the planar feature. For example, the information that identifies the object as having the one or more of the linear feature or the planar feature can include information that identifies the object as: (1) a lane boundary of a lane of a road in the images, (2) a road boundary of the road, or (3) another landmark in the images. For example, the landmark can include a sign. For example, the information that identifies the object as the sign can further include information about: (1) for a center of the sign, a latitude position, a longitude position, and an altitude, (2) a height of the sign, and (3) a width of the sign.

With reference to FIGS. 10A and 10B, for example: (1) in the first table 1002, the data affiliated with: (a) the first keypoint 602 can include semantic information that indicates that the first keypoint 602 is affiliated with a road boundary, (b) the second keypoint 604 can include semantic information that indicates that the second keypoint 604 is affiliated with a road boundary, (c) the third keypoint 606 can include semantic information that indicates that the third keypoint 606 is affiliated with a lane boundary, (d) the fourth keypoint 608 can include semantic information that indicates that the fourth keypoint 608 is affiliated with a sign, and (c) the fifth keypoint 610 can include semantic information that indicates that the fifth keypoint 610 is affiliated with a sign; (2) in the second table 1004, the data affiliated with: (a) the sixth keypoint 702 can include semantic information that indicates that the sixth keypoint 702 is affiliated with a road boundary, (b) the seventh keypoint 704 can include semantic information that indicates that the seventh keypoint 704 is affiliated with a road boundary, (c) the eighth keypoint 706 can include semantic information that indicates that the eighth keypoint 706 is affiliated with a lane boundary. (d) the fourth keypoint 608 can include semantic information that indicates that the fourth keypoint 608 is affiliated with a sign, and (c) the fifth keypoint 610 can include semantic information that indicates that the fifth keypoint 610 is affiliated with a sign; (3) in the third table 1006, the data affiliated with: (a) the ninth keypoint 802 can include semantic information that indicates that the ninth keypoint 802 is affiliated with a road boundary, (b) the tenth keypoint 804 can include semantic information that indicates that the tenth keypoint 804 is affiliated with a road boundary, (c) the eleventh keypoint 806 can include semantic information that indicates that the eleventh keypoint 806 is affiliated with a lane boundary, (d) the fourth keypoint 608 can include semantic information that indicates that the fourth keypoint 608 is affiliated with a sign, (c) the fifth keypoint 610 can include semantic information that indicates that the fifth keypoint 610 is affiliated with a road boundary, and (f) the twelfth keypoint 808 can include semantic information that indicates that the twelfth keypoint 808 is affiliated with a sign; and (4) in the fourth table 1008, the data affiliated with: (a) the thirteenth keypoint 902 can include semantic information that indicates that the thirteenth keypoint 902 is affiliated with a road boundary, (b) the fourteenth keypoint 904 can include semantic information that indicates that the fourteenth keypoint 904 is affiliated with a road boundary, (c) the fifteenth keypoint 906 can include semantic information that indicates that the fifteenth keypoint 906 is affiliated with a lane boundary, (d) the fourth keypoint 608 can include semantic information that indicates that the fourth keypoint 608 is affiliated with a sign, (c) the fifth keypoint 610 can include semantic information that indicates that the fifth keypoint 610 is affiliated with a sign, and (f) the twelfth keypoint 808 can include semantic information that indicates that the twelfth keypoint 808 is affiliated with a sign.

Accordingly, each of: (1) the first keypoint 602, (2) the second keypoint 604, (3) the third keypoint 606, (4) the fourth keypoint 608, (5) the fifth keypoint 610, (6) the sixth keypoint 702, (7) the seventh keypoint 704, (8) the eighth keypoint 706, (9) the ninth keypoint 802, (10) the tenth keypoint 804. (11) the eleventh keypoint 806, (12) the twelfth keypoint 808, (13) the thirteenth keypoint, (14) the fourteenth keypoint 904, and (15) the fifteenth keypoint 906 can be affiliated with an object that has a linear feature (e.g., a road surface marking or a pole); and each of: (1) the fourth keypoint 608, (2) the fifth keypoint 610, and (3) the twelfth keypoint 808 can be affiliated with an object that has a planar feature (e.g., a sign).

Returning to FIG. 18, for example, the alignment module 1212 can include instructions that function to control the processor 1202 to correct, in a manner that recognizes that the object has the one or more of the linear feature or the planar feature, the alignment of the positions to produce a digital map of the location.

For example, the instructions to correct the alignment of the positions can include instructions to correct, using one or more simultaneous localization and mapping techniques, the alignment of the positions. For example, the one or more simultaneous localization and mapping techniques can include at one or more optimization techniques. For example, the one or more optimization techniques can include: (1) in response to the object having the linear feature, an optimization technique devised for optimization of linear features or (2) in response to the object having the planar feature, an optimization technique devised for optimization of planar features.

Additionally or alternatively, for example, the instructions to correct the alignment of the positions can include: (1) instructions to represent, in response to the object having the linear feature, estimates of the positions of the points as probability distributions having prolate spheroid shapes with major axes that are one of coincidental or parallel to lines that define the linear feature or (2) instructions to represent, in response to the object having the planar feature, the estimates of the positions of the points as probability distributions having oblate spheroid shapes with minor axes that are perpendicular to planes that defines the planar feature.

FIG. 19 includes a diagram 1900 that illustrates an example of the positions of the points of the objects, included in the diagram 1100 illustrated in FIG. 11, that have horizontal linear features, according to the disclosed technologies. For example, the diagram 1900 can include: (1) the position 1102, (2) the position 1104. (3) the position 1106, (4) the position 1112, (5) the position 1114, (6) the position 1116, (7) the position 1122. (8) the position 1124, (9) the position 1126, (10) the position 1134, (11) the position 1136, and (12) the position 1138.

For example, the diagram 1900 can also include: (1) a probability distribution 1902 affiliated with the position 1102. (2) a probability distribution 1904 affiliated with the position 1104. (3) a probability distribution 1906 affiliated with the position 1106. (4) a probability distribution 1908 affiliated with the position 1112. (5) a probability distribution 1910 affiliated with the position 1114, (6) a probability distribution 1912 affiliated with the position 1116, (7) a probability distribution 1914 affiliated with the position 1122. (8) a probability distribution 1916 affiliated with the position 1124, (9) a probability distribution 1918 affiliated with the position 1126. (10) a probability distribution 1920 affiliated with the position 1134, (11) a probability distribution 1922 affiliated with the position 1136, and (12) a probability distribution 1924 affiliated with the position 1138.

For example, each of: (1) the probability distribution 1902, (2) the probability distribution 1904, (3) the probability distribution 1906, (4) the probability distribution 1908, (5) the probability distribution 1910, (6) the probability distribution 1912, (7) the probability distribution 1914, (8) the probability distribution 1916, (9) the probability distribution 1918, (10) the probability distribution 1920, (11) the probability distribution 1922, and (12) the probability distribution 1924 can have a prolate spheroid shape with a major axis that is one of coincidental or parallel to a line that defines the linear feature.

A view (a) of FIG. 19 is a diagram of the positions of the points before a correction of the alignment. A view (b) of FIG. 19 is a diagram of the positions of the points after the correction of the alignment. One of skill in the art, in light of the description herein, understands that: (1) because the points are affiliated with objects that have linear features, estimates of the positions of the points can be represented as probability distributions having prolate spheroid shapes and (2) having the points represented as probability distributions having prolate spheroid shapes can facilitate the correction of the alignment.

Figure 20:
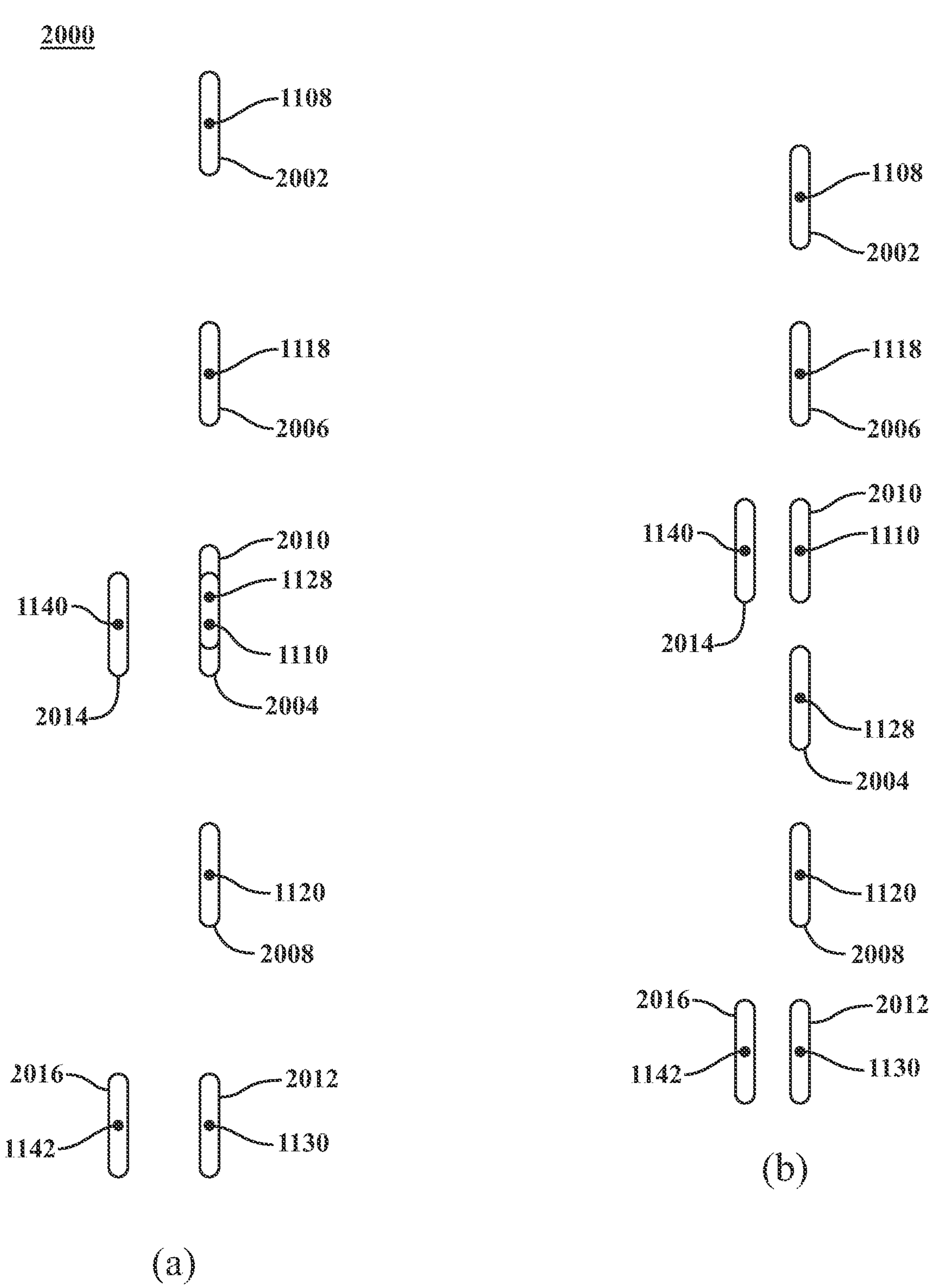
FIG. 20 includes a diagram that illustrates an example of the positions of the points of the objects, included in the diagram illustrated in FIG. 11, that have vertical linear features, according to the disclosed technologies.

FIG. 20 includes a diagram 2000 that illustrates an example of the positions of the points of the objects, included in the diagram 1100 illustrated in FIG. 11, that have vertical linear features, according to the disclosed technologies. For example, the diagram 2000 can include: (1) the position 1108, (2) the position 1110, (3) the position 1118, (4) the position 1120, (5) the position 1128, (6) the position 1130, (7) the position 1140, and (8) the position 1142.

For example, the diagram 2000 can also include: (1) a probability distribution 2002 affiliated with the position 1108, (2) a probability distribution 2004 affiliated with the position 1110, (3) a probability distribution 2006 affiliated with the position 1118, (4) a probability distribution 2008 affiliated with the position 1120, (5) a probability distribution 2010 affiliated with the position 1128, (6) a probability distribution 2012 affiliated with the position 1130, (7) a probability distribution 2014 affiliated with the position 1140, and (8) a probability distribution 2016 affiliated with the position 1142.

For example, each of: (1) the probability distribution 2002. (2) the probability distribution 2004, (3) the probability distribution 2006, (4) the probability distribution 2008, (5) the probability distribution 2010, (6) the probability distribution 2012, (7) the probability distribution 2014, and (8) the probability distribution 2016 can have a prolate spheroid shape with a major axis that is one of coincidental or parallel to a line that defines the linear feature.

A view (a) of FIG. 20 is a diagram of the positions of the points before a correction of the alignment. A view (b) of FIG. 20 is a diagram of the positions of the points after the correction of the alignment. One of skill in the art, in light of the description herein, understands that: (1) because the points are affiliated with objects that have linear features, estimates of the positions of the points can be represented as probability distributions having prolate spheroid shapes and (2) having the points represented as probability distributions having prolate spheroid shapes can facilitate the correction of the alignment.

FIG. 21 includes a diagram 2100 that illustrates an example of the positions of the points of the objects, included in the diagram 1100 illustrated in FIG. 11, that have planar features, according to the disclosed technologies. For example, the diagram 2100 can include: (1) the position 1132 and (2) the position 1144.

For example, the diagram 2100 can also include: (1) a probability distribution 2102 affiliated with the position 1132 and (2) a probability distribution 2104 affiliated with the position 1144.

For example, each of: (1) the probability distribution 2102 and (2) the probability distribution 2104 can have an oblate spheroid shape with a minor axis that is perpendicular to a plane that defines the planar feature.

A view (a) of FIG. 21 is a diagram of the positions of the points before a correction of the alignment. A view (b) of FIG. 21 is a diagram of the positions of the points after the correction of the alignment. One of skill in the art, in light of the description herein, understands that: (1) because the points are affiliated with objects that have planar features, estimates of the positions of the points can be represented as probability distributions having oblate spheroid shapes and (2) having the points represented as probability distributions having oblate spheroid shapes can facilitate the correction of the alignment.

FIGS. 22A and 22B include an example of tables 2200 that illustrate the data contained in the tables 1000 included in FIGS. 10A and 10B, but with values affiliated with a correction of an alignment of the positions of the points, according to the disclosed technologies. The tables 2200 can include: (1) a first table 2202 that illustrates items of the data affiliated with the image 200 produced, at the first time ($t_1$), by the forward-facing camera 136 attached to the first vehicle 130; (2) a second table 2204 that illustrates items of the data affiliated with the image 300 produced, at the second time ($t_2$), by the forward-facing camera 136 attached to the first vehicle 130; (3) a third table 2206 that illustrates items of the data affiliated with the image 400 produced, at the first time ($t_1$), by the forward-facing camera 138 attached to the second vehicle 132; and (4) a fourth table 2208 that illustrates items of the data affiliated with the image 500 produced, at the second time ($t_2$), by the forward-facing camera 138 attached to the second vehicle 132.

The first table 2202 can include, for example, data affiliated with the first keypoint 602, the second keypoint 604, the third keypoint 606, the fourth keypoint 608, and the fifth keypoint 610. The second table 2204 can include, for example, data affiliated with the sixth keypoint 702, the seventh keypoint 704, the eighth keypoint 706, the fourth keypoint 608, and the fifth keypoint 610. The third table 2206 can include, for example, data affiliated with the ninth keypoint 802, the tenth keypoint 804, the eleventh keypoint 806, the fourth keypoint 608, the fifth keypoint 610, and the twelfth keypoint 808. The fourth table 2208 can include, for example, data affiliated with the thirteenth keypoint 902, the fourteenth keypoint 904, the fifteenth keypoint 906, the fourth keypoint 608, the fifth keypoint 610, and the twelfth keypoint 808.

Returning to FIG. 18, additionally or alternatively, for example, the data affiliated with the images can further include information about: (1) a set of identifications of a set of cameras that produced the images and (2) a set of estimates of poses of the set of cameras.

With reference to FIGS. 1, 10A, and 10B, for example: (1) the first table 1002, which illustrates items of the data affiliated with the image 200 produced, at the first time ($t_1$), by the forward-facing camera 136 attached to the first vehicle 130 can include: (a) the identification 1010 of the forward-facing camera 136 attached to the first vehicle 130 and (b) the pose 1012 of the forward-facing camera 136 attached to the first vehicle 130 at the first time ($t_1$); (2) the second table 1004, which illustrates items of the data affiliated with the image 300 produced, at the second time ($t_2$), by the forward-facing camera 136 attached to the first vehicle 130 can include: (a) the identification 1010 of the forward-facing camera 136 attached to the first vehicle 130 and (b) the pose 1014 of the forward-facing camera 136 attached to the first vehicle 130 at the second time ($t_2$); (3) the third table 1006, which illustrates items of the data affiliated with the image 400 produced, at the first time ($t_1$), by the forward-facing camera 138 attached to the second vehicle 132 can include: (a) the identification 1016 of the forward-facing camera 138 attached to the second vehicle 132 and (b) the pose 1018 of the forward-facing camera 138 attached to the second vehicle 132 at the first time ($t_1$); and (4) the fourth table 1008, which illustrates items of the data affiliated with the image 500 produced, at the second time ($t_2$), by the forward-facing camera 138 attached to the second vehicle 132 can include: (a) the identification 1016 of the forward-facing camera 138 attached to the second vehicle 132 and (b) the pose 1020 of the forward-facing camera 138 attached to the second vehicle 132 at the second time ($t_2$).

For example, the images, produced by a camera of the set of cameras, can be produced at a specific production rate. For example, the specific production rate can be ten hertz. For example, the set of cameras can be attached to a set of vehicles (e.g., the forward-facing camera 136 attached to the first vehicle 130 or the forward-facing camera 138 attached to the second vehicle 132). For example, the camera, of the set of cameras, can be a forward-facing camera. For example, the camera, of the set of cameras, can be a component in a lane keeping assist (LKA) system.

Returning to FIG. 18, additionally, for example, the alignment module 1212 can further include instructions to correct an estimate of a pose, of the set of estimates of the poses, of a camera of the set of cameras.

With reference to FIGS. 22A, and 22B, for example: (1) the first table 2202 can include the identification 1010 of the forward-facing camera 136 attached to the first vehicle 130 and the pose 1012 of the forward-facing camera 136 attached to the first vehicle 130 at the first time ($t_1$), but with values affiliated with a correction of the estimate of the pose 1012, (2) the second table 2204 can include the identification 1010 of the forward-facing camera 136 attached to the first vehicle 130 and the pose 1014 of the forward-facing camera 136 attached to the first vehicle 130 at the second time ($t_2$), but with values affiliated with a correction of the estimate of the pose 1014, (3) the third table 2206 can include the identification 1016 of the forward-facing camera 138 attached to the second vehicle 132 and the pose 1018 of the forward-facing camera 138 attached to the second vehicle 132 at the first time ($t_1$), but with values affiliated with a correction of the estimate of the pose 1018, and (4) the fourth table 2208 can include the identification 1016 of the forward-facing camera 138 attached to the second vehicle 132 and the pose 1020 of the forward-facing camera 138 attached to the second vehicle 132 at the second time ($t_2$), but with values affiliated with a correction of the estimate of the pose 1020.

Returning to FIG. 18, additionally, in this example: (1) the camera can be a forward-facing camera and (2) the object that has the one or more of the linear feature or the planar feature can be: (a) a lane boundary of a lane of a road in the images or (b) a road boundary of the road. The instructions to correct the estimate of the pose of the camera can include instructions to adjust a position of the pose of the camera in a direction perpendicular to a direction of a major axis of the object that has the one or more of the linear feature or the planar feature.

Returning to FIG. 19, for example, the diagram 1900 can further include the second vehicle 132 with the forward-facing camera 138 attached. The second vehicle 132 can be located between the lane boundary 118 (e.g., indicated by the position 1106, the position 1116, the position 1126, and the position 1138) and the road boundary 116 (e.g., indicated by the position 1104, the position 1114, the position 1124, and the position 1136). The position of the pose of the forward-facing camera 138 can be adjusted in a direction perpendicular to the direction of the major axis of one or more of the lane boundary 118 or the road boundary 116. The view (a) of FIG. 19 includes the position of the pose of the forward-facing camera 138 before the correction of the alignment. The view (b) of FIG. 19 includes the position of the pose of the forward-facing camera 138 after the correction of the alignment.

Returning to FIG. 18, for example, the communications module 1208 can include instructions that function to control the processor 1202 to transmit the digital map to a specific vehicle to be used to control a movement of the specific vehicle. With reference to FIG. 1, for example, the instructions to cause the processor 1202 to transmit the digital map can cause the communications device 148 included in the system 146 to transmit the digital map to the communications device 144 disposed on the third vehicle 134.

Returning to FIG. 18, additionally, for example, the communications module 1208 can include instructions that function to control the processor 1202 to receive, from a set of vehicles, the data affiliated with the images. With reference to FIG. 1, for example, the instructions to cause the processor 1202 to receive the data affiliated with the images can cause the communications device 148 included in the system 146 to receive the data affiliated with the images from the communications device 140 disposed on the first vehicle 130, the communications device 142 disposed on the second vehicle 132, or both.

For example, the instructions to receive can include instructions to receive, from a vehicle of the set of vehicles and at a specific communication rate, the data affiliated with the images. For example, the specific communication rate can be once per thirty seconds. For example, the data can be produced by an automated driving system of active safety technologies and advanced driver assistance systems (ADAS). For example, the automated driving system can be a third generation of the Toyota Safety Sense™ system (TSS3).

Figure 23:
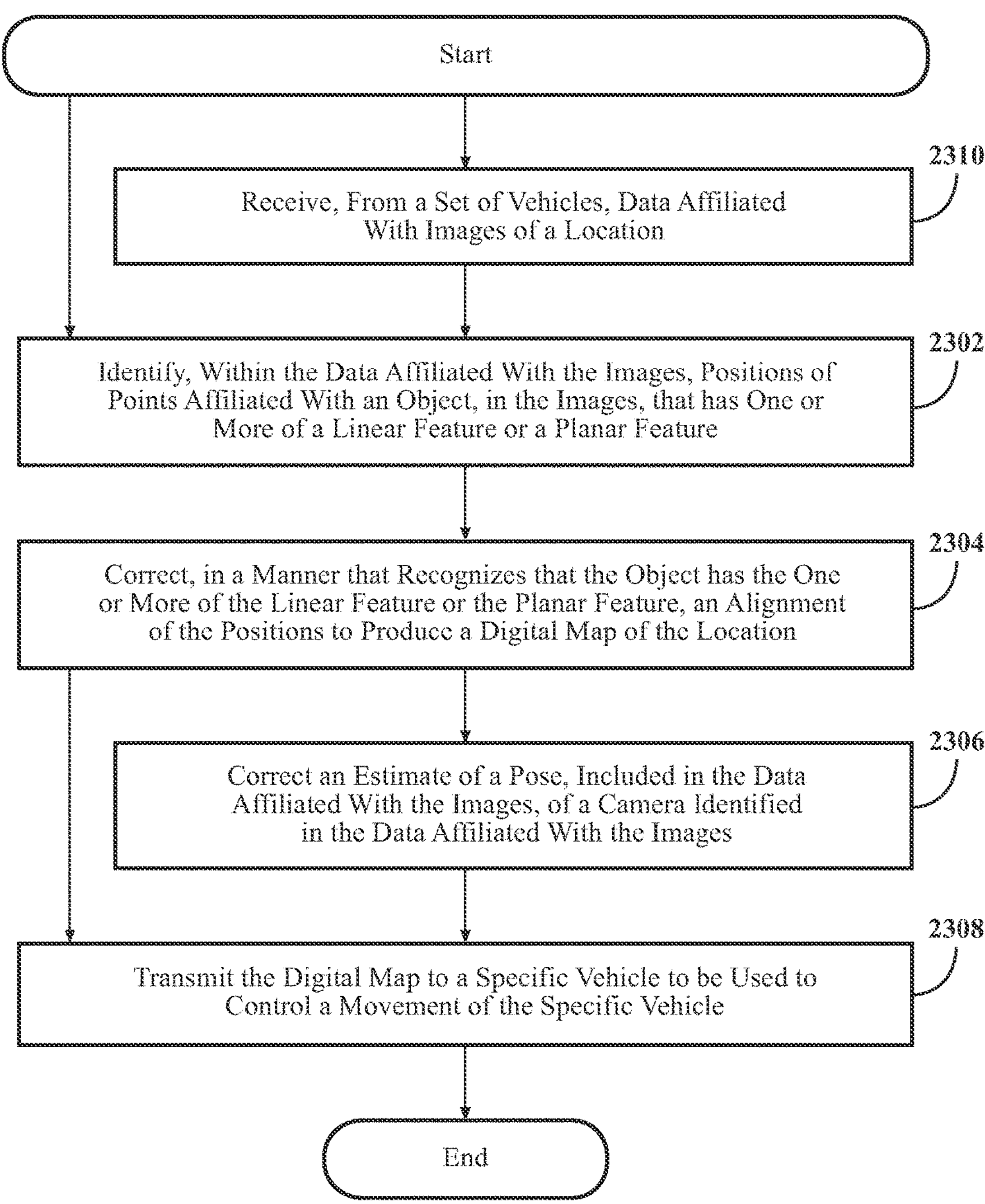
FIG. 23 includes a flow diagram that illustrates an example of a method that is associated with correcting an alignment of positions of points affiliated with an object, in images of a location, that has one or more of a linear feature or a planar feature, according to the disclosed technologies.

FIG. 23 includes a flow diagram that illustrates an example of a method 2300 that is associated with correcting an alignment of positions of points affiliated with an object, in images of a location, that has one or more of a linear feature or a planar feature, according to the disclosed technologies. For example, the points can include keypoints. Although the method 2300 is described in combination with the system 1800 illustrated in FIG. 18, one of skill in the art understands, in light of the description herein, that the method 2300 is not limited to being implemented by the system 1800 illustrated in FIG. 18. Rather, the system 1800 illustrated in FIG. 18 is an example of a system that may be used to implement the method 2300. Additionally, although the method 2300 is illustrated as a generally serial process, various aspects of the method 2300 may be able to be executed in parallel.

In the method 2300, at an operation 2302, for example, the alignment module 1212 can identify, within data affiliated with the images of the location, the positions of the points affiliated with the object, in the images, that has the one or more of the linear feature or the planar feature. For example, the data affiliated with the images can further include information that identifies the object as having the one or more of the linear feature or the planar feature. For example, the information that identifies the object as having the one or more of the linear feature or the planar feature can include information that identifies the object as: (1) a lane boundary of a lane of a road in the images, (2) a road boundary of the road, or (3) another landmark in the images. For example, the landmark can include a sign. For example, the information that identifies the object as the sign can further include information about: (1) for a center of the sign, a latitude position, a longitude position, and an altitude, (2) a height of the sign, and (3) a width of the sign.

At an operation 2304, for example, the alignment module 1212 can correct, in a manner that recognizes that the object has the one or more of the linear feature or the planar feature, the alignment of the positions to produce a digital map of the location.

For example, in the operation 2304, the alignment module 1212 can correct, using one or more simultaneous localization and mapping techniques, the alignment of the positions. For example, the one or more simultaneous localization and mapping techniques can include at one or more optimization techniques. For example, the one or more optimization techniques can include: (1) in response to the object having the linear feature, an optimization technique devised for optimization of linear features or (2) in response to the object having the planar feature, an optimization technique devised for optimization of planar features.

Additionally or alternatively, for example, in the operation 2304, the alignment module 1212 can: (1) represent, in response to the object having the linear feature, estimates of the positions of the points as probability distributions having prolate spheroid shapes with major axes that are one of coincidental or parallel to lines that define the linear feature or (2) represent, in response to the object having the planar feature, the estimates of the positions of the points as probability distributions having oblate spheroid shapes with minor axes that are perpendicular to planes that defines the planar feature.

Additionally or alternatively, for example, the data affiliated with the images can further include information about: (1) a set of identifications of a set of cameras that produced the images and (2) a set of estimates of poses of the set of cameras.

For example, the images, produced by a camera of the set of cameras, can be produced at a specific production rate. For example, the specific production rate can be ten hertz. For example, the set of cameras can be attached to a set of vehicles (e.g., the forward-facing camera 136 attached to the first vehicle 130 or the forward-facing camera 138 attached to the second vehicle 132). For example, the camera, of the set of cameras, can be a forward-facing camera. For example, the camera, of the set of cameras, can be a component in a lane keeping assist (LKA) system.

Additionally, at an operation 2306, for example, the alignment module 1212 can correct an estimate of a pose, of the set of estimates of the poses, of a camera of the set of cameras.

Additionally, in this example: (1) the camera can be a forward-facing camera and (2) the object that has the one or more of the linear feature or the planar feature can be: (a) a lane boundary of a lane of a road in the images or (b) a road boundary of the road. For example, in the operation 2306, the alignment module 1212 can adjust a position of the pose of the camera in a direction perpendicular to a direction of a major axis of the object that has the one or more of the linear feature or the planar feature.

At an operation 2308, for example, the communications module 1208 can transmit the digital map to a specific vehicle to be used to control a movement of the specific vehicle.

Additionally, at an operation 2310, for example, the communications module 1208 can receive, from a set of vehicles, the data affiliated with the images.

For example, in the operation 2310, the communications module 1208 can receive, from a vehicle of the set of vehicles and at a specific communication rate, the data affiliated with the images. For example, the specific communication rate can be once per thirty seconds. For example, the data can be produced by an automated driving system of active safety technologies and advanced driver assistance systems (ADAS). For example, the automated driving system can be a third generation of the Toyota Safety Sense™ system (TSS3).

Figure 24:
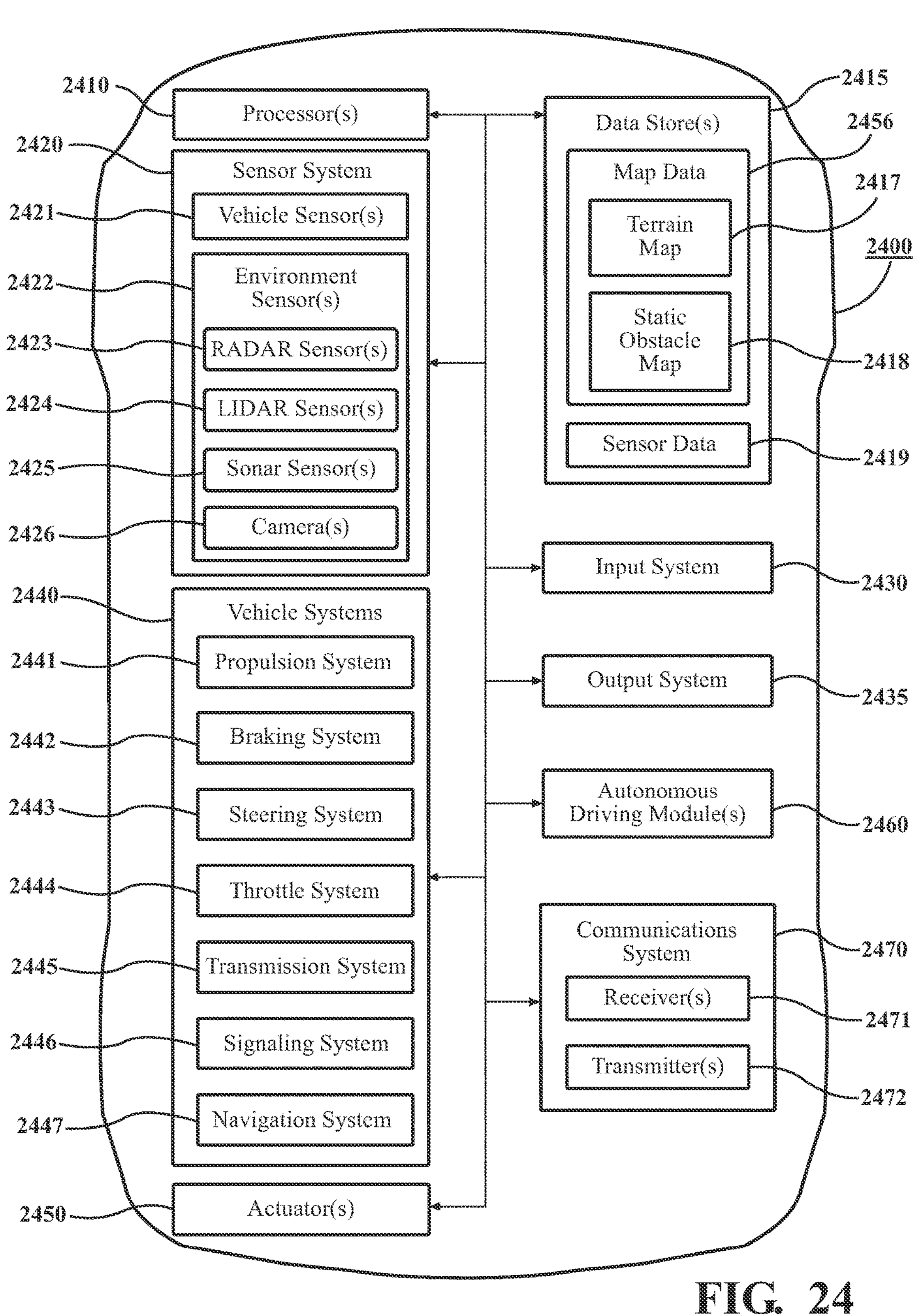
FIG. 24 includes a block diagram that illustrates an example of elements disposed on a vehicle, according to the disclosed technologies.

FIG. 24 includes a block diagram that illustrates an example of elements disposed on a vehicle 2400, according to the disclosed technologies. As used herein, a "vehicle" can be any form of powered transport. In one or more implementations, the vehicle 2400 can be an automobile. While arrangements described herein are with respect to automobiles, one of skill in the art understands, in light of the description herein, that embodiments are not limited to automobiles. For example, functions and/or operations of one or more of the first vehicle 130 (illustrated in FIG. 1), the second vehicle 132 (illustrated in FIG. 1), or the third vehicle 134 (illustrated in FIG. 1) can be realized by the vehicle 2400.

In some embodiments, the vehicle 2400 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 2400 is performed according to inputs received from a user (e.g., human driver). In one or more arrangements, the vehicle 2400 can be a conventional vehicle that is configured to operate in only a manual mode.

In one or more embodiments, the vehicle 2400 can be an automated vehicle. As used herein, "automated vehicle" can refer to a vehicle that operates in an automated mode. As used herein, "automated mode" can refer to navigating and/or maneuvering the vehicle 2400 along a travel route using one or more computing systems to control the vehicle

2400 with minimal or no input from a human driver. In one or more embodiments, the vehicle 2400 can be highly automated or completely automated. In one embodiment, the vehicle 2400 can be configured with one or more semi-automated operational modes in which one or more computing systems perform a portion of the navigation and/or maneuvering of the vehicle along a travel route, and a vehicle operator (i.e., driver) provides inputs to the vehicle 2400 to perform a portion of the navigation and/or maneuvering of the vehicle 2400 along a travel route.

For example, Standard J3016 202104, Taxonomy and Definitions for Terms Related to Driving Automation Systems for On-Road Motor Vehicles, issued by the Society of Automotive Engineers (SAE) International on Jan. 16, 2014, and most recently revised on Apr. 30, 2021, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 2400 can include various elements. The vehicle 2400 can have any combination of the various elements illustrated in FIG. 24. In various embodiments, it may not be necessary for the vehicle 2400 to include all of the elements illustrated in FIG. 24. Furthermore, the vehicle 2400 can have elements in addition to those illustrated in FIG. 24. While the various elements are illustrated in FIG. 24 as being located within the vehicle 2400, one or more of these elements can be located external to the vehicle 2400. Furthermore, the elements illustrated may be physically separated by large distances. For example, as described, one or more components of the disclosed system can be implemented within the vehicle 2400 while other components of the system can be implemented within a cloud-computing environment, as described below. For example, the elements can include one or more processors 2410, one or more data stores 2415, a sensor system 2420, an input system 2430, an output system 2435, vehicle systems 2440, one or more actuators 2450, one or more automated driving modules 2460, a communications system 2470.

In one or more arrangements, the one or more processors 2410 can be a main processor of the vehicle 2400. For example, the one or more processors 2410 can be an electronic control unit (ECU).

The one or more data stores 2415 can store, for example, one or more types of data. The one or more data stores 2415 can include volatile memory and/or non-volatile memory. Examples of suitable memory for the one or more data stores 2415 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 2415 can be a component of the one or more processors 2410. Additionally or alternatively, the one or more data stores 2415 can be operatively connected to the one or more processors 2410 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 2415 can store map data 2416. The map data 2416 can include maps of one or more geographic areas. In some instances, the map data 2416 can include information or data on roads, traffic control devices, road markings, structures, features, and/or landmarks in the one or more geographic areas. The map data 2416 can be in any suitable form. In some instances, the map data 2416 can include aerial views of an area. In some instances, the map data 2416 can include ground views of an area, including 360-degree ground views. The map data 2416 can include measurements, dimensions, distances, and/or information for one or more items included in the map data 2416 and/or relative to other items included in the map data 2416. The map data 2416 can include a digital map with information about road geometry. The map data 2416 can be high quality and/or highly detailed. For example, functions and/or operations of one or more of the digital map 1600 (illustrated in FIG. 16) can be realized by the map data 2416.

In one or more arrangements, the map data 2416 can include one or more terrain maps 2417. The one or more terrain maps 2417 can include information about the ground, terrain, roads, surfaces, and/or other features of one or more geographic areas. The one or more terrain maps 2417 can include elevation data of the one or more geographic areas. The map data 2416 can be high quality and/or highly detailed. The one or more terrain maps 2417 can define one or more ground surfaces, which can include paved roads, unpaved roads, land, and other things that define a ground surface.

In one or more arrangements, the map data 2416 can include one or more static obstacle maps 2418. The one or more static obstacle maps 2418 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 2418 can have location data, size data, dimension data, material data, and/or other data associated with them. The one or more static obstacle maps 2418 can include measurements, dimensions, distances, and/or information for one or more static obstacles. The one or more static obstacle maps 2418 can be high quality and/or highly detailed. The one or more static obstacle maps 2418 can be updated to reflect changes within a mapped area.

In one or more arrangements, the one or more data stores 2415 can store sensor data 2419. As used herein, "sensor data" can refer to any information about the sensors with which the vehicle 2400 can be equipped including the capabilities of and other information about such sensors. The sensor data 2419 can relate to one or more sensors of the sensor system 2420. For example, in one or more arrangements, the sensor data 2419 can include information about one or more lidar sensors 2424 of the sensor system 2420.

In some arrangements, at least a portion of the map data 2416 and/or the sensor data 2419 can be located in one or more data stores 2415 that are located onboard the vehicle 2400. Additionally or alternatively, at least a portion of the map data 2416 and/or the sensor data 2419 can be located in one or more data stores 2415 that are located remotely from the vehicle 2400.

The sensor system 2420 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 2420 includes a plurality of sensors, the sensors can work independently from each other. Alternatively, two or more of the sensors can work in combination with each other. In such a case, the two or more sensors can form a sensor network. The sensor system 2420 and/or the one or more sensors can be operatively connected to the one or more processors 2410, the one or more data stores 2415, and/or another element of the vehicle 2400 (including any of the elements illustrated in FIG. 24). The sensor system 2420 can acquire data of at least a portion of the external environment of the vehicle 2400 (e.g., nearby vehicles). The sensor system 2420 can include any suitable type of sensor. Various examples of different types of sensors are described herein. However, one of skill in the art understands that the embodiments are not limited to the particular sensors described herein.

The sensor system 2420 can include one or more vehicle sensors 2421. The one or more vehicle sensors 2421 can detect, determine, and/or sense information about the vehicle 2400 itself. In one or more arrangements, the one or more vehicle sensors 2421 can be configured to detect and/or sense position and orientation changes of the vehicle 2400 such as, for example, based on inertial acceleration. In one or more arrangements, the one or more vehicle sensors 2421 can include one or more accelerometers, one or more gyroscopes, an inertial measurement unit (IMU), a dead-reckoning system, a global navigation satellite system (GNSS), a global positioning system (GPS), a navigation system 2447, and/or other suitable sensors. The one or more vehicle sensors 2421 can be configured to detect and/or sense one or more characteristics of the vehicle 2400. In one or more arrangements, the one or more vehicle sensors 2421 can include a speedometer to determine a current speed of the vehicle 2400.

Additionally or alternatively, the sensor system 2420 can include one or more environment sensors 2422 configured to acquire and/or sense driving environment data. As used herein, "driving environment data" can include data or information about the external environment in which a vehicle is located or one or more portions thereof. For example, the one or more environment sensors 2422 can be configured to detect, quantify, and/or sense obstacles in at least a portion of the external environment of the vehicle 2400 and/or information/data about such obstacles. Such obstacles may be stationary objects and/or dynamic objects. The one or more environment sensors 2422 can be configured to detect, measure, quantify, and/or sense other things in the external environment of the vehicle 2400 such as, for example, lane markers, signs, traffic lights, traffic signs, lane lines, crosswalks, curbs proximate the vehicle 2400, off-road objects, etc.

Various examples of sensors of the sensor system 2420 are described herein. The example sensors may be part of the one or more vehicle sensors 2421 and/or the one or more environment sensors 2422. However, one of skill in the art understands that the embodiments are not limited to the particular sensors described.

In one or more arrangements, the one or more environment sensors 2422 can include one or more radar sensors 2423, one or more lidar sensors 2424, one or more sonar sensors 2425, and/or one more cameras 2426. In one or more arrangements, the one or more cameras 2426 can be one or more high dynamic range (HDR) cameras or one or more infrared (IR) cameras. For example, the one or more cameras 2426 can be used to record a reality of a state of an item of information that can appear in the digital map. For example, functions and/or operations of the forward-facing camera 136 (illustrated in FIG. 1) or the forward-facing camera 138 (illustrated in FIG. 1) can be realized by the one or more cameras 2426.

The input system 2430 can include any device, component, system, element, arrangement, or groups thereof that enable information/data to be entered into a machine. The input system 2430 can receive an input from a vehicle passenger (e.g., a driver or a passenger). The output system 2435 can include any device, component, system, element, arrangement, or groups thereof that enable information/data to be presented to a vehicle passenger (e.g., a driver or a passenger).

Various examples of the one or more vehicle systems 2440 are illustrated in FIG. 24. However, one of skill in the art understands that the vehicle 2400 can include more, fewer, or different vehicle systems. Although particular vehicle systems can be separately defined, each or any of the systems or portions thereof may be otherwise combined or segregated via hardware and/or software within the vehicle 2400. For example, the one or more vehicle systems 2440 can include a propulsion system 2441, a braking system 2442, a steering system 2443, a throttle system 2444, a transmission system 2445, a signaling system 2446, and/or the navigation system 2447. Each of these systems can include one or more devices, components, and/or a combination thereof, now known or later developed.

The navigation system 2447 can include one or more devices, applications, and/or combinations thereof, now known or later developed, configured to determine the geographic location of the vehicle 2400 and/or to determine a travel route for the vehicle 2400. The navigation system 2447 can include one or more mapping applications to determine a travel route for the vehicle 2400. The navigation system 2447 can include a global positioning system, a local positioning system, a geolocation system, and/or a combination thereof.

The one or more actuators 2450 can be any element or combination of elements operable to modify, adjust, and/or alter one or more of the vehicle systems 2440 or components thereof responsive to receiving signals or other inputs from the one or more processors 2410 and/or the one or more automated driving modules 2460. Any suitable actuator can be used. For example, the one or more actuators 2450 can include motors, pneumatic actuators, hydraulic pistons, relays, solenoids, and/or piezoelectric actuators.

The one or more processors 2410 and/or the one or more automated driving modules 2460 can be operatively connected to communicate with the various vehicle systems 2440 and/or individual components thereof. For example, the one or more processors 2410 and/or the one or more automated driving modules 2460 can be in communication to send and/or receive information from the various vehicle systems 2440 to control the movement, speed, maneuvering, heading, direction, etc. of the vehicle 2400. The one or more processors 2410 and/or the one or more automated driving modules 2460 may control some or all of these vehicle systems 2440 and, thus, may be partially or fully automated.

The one or more processors 2410 and/or the one or more automated driving modules 2460 may be operable to control the navigation and/or maneuvering of the vehicle 2400 by controlling one or more of the vehicle systems 2440 and/or components thereof. For example, when operating in an automated mode, the one or more processors 2410 and/or the one or more automated driving modules 2460 can control the direction and/or speed of the vehicle 2400. The one or more processors 2410 and/or the one or more automated driving modules 2460 can cause the vehicle 2400 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner. The communications system 2470 can include one or more receivers 2471 and/or one or more transmitters 2472. The communications system 2470 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 2470 can include "connected vehicle" technology. "Connected vehicle" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies. For example, functions and/or operations of the communications device 140 (illustrated in FIG. 1), the communications device 142 (illustrated in FIG. 1), or the communications device 144 (illustrated in FIG. 1) can be realized by the communications system 2470.

Moreover, the one or more processors 2410, the one or more data stores 2415, and the communications system 2470 can be configured to one or more of form a micro cloud, participate as a member of a micro cloud, or perform a function of a leader of a mobile micro cloud. A micro cloud can be characterized by a distribution, among members of the micro cloud, of one or more of one or more computing resources or one or more data storage resources in order to collaborate on executing operations. The members can include at least connected vehicles.

The vehicle 2400 can include one or more modules, at least some of which are described herein. The modules can be implemented as computer-readable program code that, when executed by the one or more processors 2410, implement one or more of the various processes described herein. One or more of the modules can be a component of the one or more processors 2410. Additionally or alternatively, one or more of the modules can be executed on and/or distributed among other processing systems to which the one or more processors 2410 can be operatively connected. The modules can include instructions (e.g., program logic) executable by the one or more processors 2410. Additionally or alternatively, the one or more data store 2415 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 2400 can include one or more automated driving modules 2460. The one or more automated driving modules 2460 can be configured to receive data from the sensor system 2420 and/or any other type of system capable of capturing information relating to the vehicle 2400 and/or the external environment of the vehicle 2400. In one or more arrangements, the one or more automated driving modules 2460 can use such data to generate one or more driving scene models. The one or more automated driving modules 2460 can determine position and velocity of the vehicle 2400. The one or more automated driving modules 2460 can determine the location of obstacles, obstacles, or other environmental features including traffic signs, trees, shrubs, neighboring vehicles, pedestrians, etc.

The one or more automated driving modules 2460 can be configured to receive and/or determine location information for obstacles within the external environment of the vehicle 2400 for use by the one or more processors 2410 and/or one or more of the modules described herein to estimate position and orientation of the vehicle 2400, vehicle position in global coordinates based on signals from a plurality of satellites, or any other data and/or signals that could be used to determine the current state of the vehicle 2400 or determine the position of the vehicle 2400 with respect to its environment for use in either creating a map or determining the position of the vehicle 2400 in respect to map data.

The one or more automated driving modules 2460 can be configured to determine one or more travel paths, current automated driving maneuvers for the vehicle 2400, future automated driving maneuvers and/or modifications to current automated driving maneuvers based on data acquired by the sensor system 2420, driving scene models, and/or data from any other suitable source such as determinations from the sensor data 2419. As used herein, “driving maneuver” can refer to one or more actions that affect the movement of a vehicle. Examples of driving maneuvers include: accelerating, decelerating, braking, turning, moving in a lateral direction of the vehicle 2400, changing travel lanes, merging into a travel lane, and/or reversing, just to name a few possibilities. The one or more automated driving modules 2460 can be configured to implement determined driving maneuvers. The one or more automated driving modules 2460 can cause, directly or indirectly, such automated driving maneuvers to be implemented. As used herein, “cause” or “causing” means to make, command, instruct, and/or enable an event or action to occur or at least be in a state where such event or action may occur, either in a direct or indirect manner. The one or more automated driving modules 2460 can be configured to execute various vehicle functions and/or to transmit data to, receive data from, interact with, and/or control the vehicle 2400 or one or more systems thereof (e.g., one or more of vehicle systems 2440). For example, functions and/or operations of an automotive navigation system can be realized by the one or more automated driving modules 2460.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-9, 10A, 10B, 11-21, 22A, 22B, 23, and 24, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase “computer-readable storage medium” means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the “C” programming language or similar programming languages. The program code may execute entirely on a user’s computer, partly on a user’s computer, as a stand-alone software package, partly on a user’s computer and partly on a remote computer, or entirely on a remote computer or server. In the latter scenario, the remote computer may be connected to the user’s computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:

a processor; and a memory storing:

an alignment module including instructions that, when executed by the processor, cause the processor to:

identify, within data affiliated with images of a location, positions of points affiliated with an object, in the images, that has at least one of a linear feature or a planar feature; and correct, in a manner that recognizes that the object has the at least one of the linear feature, in which estimates of the positions of the points are represented as probability distributions having prolate spheroid shapes, or the planar feature, in which the estimates are represented as probability distributions having oblate spheroid shapes, an alignment of the positions to produce a digital map of the location; and a communications module including instructions that, when executed by the processor, cause the processor to transmit the digital map to a specific vehicle to be used to control a movement of the specific vehicle.

2. The system of claim 1, wherein the data affiliated with the images further include information that identifies the object as having the at least one of the linear feature or the planar feature.

3. The system of claim 2, wherein the information that identifies the object as having the at least one of the linear feature or the planar feature includes information that identifies the object as:

a lane boundary of a lane of a road in the images, a road boundary of the road, or a landmark in the images.

4. The system of claim 3, wherein:

the landmark comprises a sign, and the information that identifies the object as the sign further includes information about:

for a center of the sign, a latitude position, a longitude position, and an altitude, a height of the sign, and a width of the sign.

5. The system of claim 1, wherein:

the prolate spheroid shapes have major axes that are one of coincidental or parallel to lines that define the linear feature, or the oblate spheroid shapes have minor axes that are perpendicular to planes that defines the planar feature.

6. The system of claim 1, wherein:

the data affiliated with the images further include information about:

a set of identifications of a set of cameras that produced the images, and a set of estimates of poses of the set of cameras, and the set of cameras is attached to a set of vehicles.

7. The system of claim 6, wherein the alignment module further includes instructions to correct an estimate of a pose, of the set of estimates of the poses, of a camera of the set of cameras.

8. The system of claim 7, wherein:

the camera is a forward-facing camera, the object that has the at least one of the linear feature or the planar feature is a lane boundary of a lane of a road in the images, or a road boundary of the road, and the instructions to correct the estimate of the pose of the camera include instructions to adjust a position of the pose of the camera in a direction perpendicular to a direction of a major axis of the object that has the at least one of the linear feature or the planar feature.

9. A method, comprising:

identifying, by a processor and within data affiliated with images of a location, positions of points affiliated with an object, in the images, that has at least one of a linear feature or a planar feature;

correcting, by the processor in a manner that recognizes that the object has the at least one of the linear feature, in which estimates of the positions of the points are represented as probability distributions having prolate spheroid shapes, or the planar feature, in which the estimates are represented as probability distributions having oblate spheroid shapes, an alignment of the positions to produce a digital map of the location; and transmitting, by the processor, the digital map to a specific vehicle to be used to control a movement of the specific vehicle.

10. A system, comprising:

a processor; and a memory storing:

a data association module including instructions that, when executed by the processor, cause the processor to perform, using a global nearest neighbor technique, a data association operation to determine if the positions of at least two points, of the points, correspond to a same object, of the objects, or to different objects of the objects, wherein the global nearest neighbor technique is configured to determine a distance between a first point, of the points, and a second point of the points, the distance affiliated with a covariance matrix that has a longitudinal axis, a lateral axis, and a vertical axis;

a production module including instructions that, when executed by the processor, cause the processor to produce, based on a result of the global nearest neighbor technique, a digital map of the location; and a communications module including instructions that, when executed by the processor, cause the processor to transmit the digital map to a specific vehicle to be used to control a movement of the specific vehicle.

11. The system of claim 10, wherein the global nearest neighbor technique comprises:

determining that at least two images, of the images, include at least two objects, of the objects, that are susceptible to being recognized, as a result of a clustering technique, as a single object, and performing the data association operation in a manner so that the result of the global nearest neighbor technique includes a determination that:

at least one position of at least one first point, of the at least two points, corresponds to a first object of the at least two objects, and at least one position of at least one second point, of the at least two points, corresponds to a second object of the at least two objects.

12. The system of claim 10, wherein the global nearest neighbor technique comprises:

determining that at least two images, of the images, include a single object, of the objects, that is susceptible to being recognized, as a result of a clustering technique, as at least two objects, and performing the data association operation in a manner so that the result of the global nearest neighbor technique includes a determination that:

at least one position of at least one first point, of the at least two points, corresponds to the single object, and at least one position of at least one second point, of the at least two points, corresponds to the single object.

13. The system of claim 10, wherein:

the points comprise a first set of points and a second set of points, the first set of points was produced at a first time, the second set of points was produced at a second time, at least one first point, of the at least two points, is included in the first set of points, at least one second point, of the at least two points, is included in the second set of points, and the global nearest neighbor technique is configured to assign a time difference between the at least one first point and the at least one second point.

14. The system of claim 10, wherein:

the points comprise a first set of points and a second set of points, the first set of points was produced by a camera attached to a first vehicle of a set of vehicles, the second set of points was produced by a camera attached to a second vehicle of the set of vehicles, a first point, of the at least two points, is included in the first set of points, a second point, of the at least two points, is included in the second set of points, and the global nearest neighbor technique is configured to assign an averaged measurement of accuracy of the first point and the second point.

15. The system of claim 10, wherein the distance comprises at least one of a Euclidean distance or a Mahalanobis distance, the at least one of the Euclidean distance or the Mahalanobis distance being between the first point, of the points, and the second point of the points.

16. The system of claim 15, wherein:

a specific object, in the images of the location, is a road, the covariance matrix, affiliated with the Mahalanobis distance, has a shape of a prolate spheroid, the longitudinal axis, of the covariance, is a first principal component axis, of the prolate spheroid of the covariance matrix, and corresponds to a longitudinal direction of the road, the lateral axis, of the covariance, is a second principal component axis, of the prolate spheroid of the covariance matrix, and corresponds to a lateral direction across the road, the vertical axis, of the covariance, is a third principal component axis, of the prolate spheroid of the covariance matrix, and corresponds to a vertical direction above the road, and a measurement of the prolate spheroid along the first principal component axis is longer than a measurement of the prolate spheroid along the second principal component axis and along the third principal component axis.

17. The system of claim 10, wherein the global nearest neighbor technique is configured to use the Hungarian algorithm.

18. The system of claim 10, wherein:

the points comprise a first set of points and a second set of points, and the global nearest neighbor technique is configured to:

determine the distance as a Euclidean distance, the Euclidean distance being between a specific point, of the first set of points, and a specific point of the second set of points, and determine, in response to the Euclidean distance being less than a threshold distance, a Mahalanobis distance, the Mahalanobis distance being between the specific point, of the first set of points, and the specific point of the second set of points.

19. The system of claim 10, wherein:

the points comprise a set of points for consideration and a set of points included in an existing digital map, and the global nearest neighbor technique is configured to:

determine a value of a cost of matching a specific point, of the set of points for consideration, and a specific point of the set of points included in the existing digital map, perform, in response to the value being less than a threshold value, a clustering technique for the specific point, of the set of points for consideration, and the specific point of the set of points included in the existing digital map, and add, in response to the value being other than less than the threshold value, the specific point, of the set of points for consideration, to the existing digital map to produce an updated digital map.

20. The system of claim 19, wherein:

the points further comprise a first set of points and a second set of points, and the global nearest neighbor technique is further configured to:

determine a first count, the first count being of a number of points in the first set of points, determine a second count, the second count being of a number of points in the second set of points, and designate, in response to the first count being greater than the second count, the first set of points as an initial set of points for consideration.

* * * * *